3,067,163
PREPARATION OF DETERGENT OIL-ADDITIVE GRAFT COPOLYMERS BY DELAYED ADDITION OF NITROGEN-CONTAINING COMONOMER TO A PARTIALLY POLYMERIZED LONG CHAIN ALKYL OR VINYL ESTER AND PRODUCT OBTAINED THEREBY
La Verne Norman Bauer, Cheltenham, Pa., assignor to Rohm & Haas Company, Philadelphia, Pa., a corporation of Delaware
No Drawing. Filed May 22, 1958, Ser. No. 736,956
11 Claims. (Cl. 260—45.5)

This invention deals with a method for preparing oil-soluble graft copolymers supplying dispersing and detergent properties to solutions thereof in hydrocarbon liquids. The method comprises initiating free radical polymerization first of at least one free radically polymerizable monoethylenically unsaturated compound being preferably composed of only carbon, hydrogen, and oxygen, and having an oil-solubilizing group, or of a mixture of one or more of such compounds and a free radically polymerizable hydrocarbon, whereby a polymerizing mixture is formed containing polymer and monomer, adding to this mixture a polymerizable monovinylidene compound, containing nitrogen which carries at least two different substituents, and continuing polymerization of said mixture and said added nitrogen-containing monovinylidene compound until a graft copolymer therefrom is obtained.

Much study and research have been directed to the problem of dispersing gums, resins, and other substances which may be present or be formed in liquid petroleum products. There is the problem on the one hand of dispersing such materials in kerosene, fuel oils, jet fuels, and other combustible hydrocarbon liquids. On the other hand, there is the problem of dispersing such materials when they occur or as they are formed in lubricating oils. Metal salts of petroleum sulfonates, for example, have been used for these purposes, but not with entirely satisfactory results. The inorganic residues resulting have often proved objectionable. Furthermore, metal sulfonates and other metal salts have not been especially effective as dispersants at low temperatures or under conditions where engines are operated intermittently.

Some small degree of success has been reported in avoiding large inorganic residues and in effecting dispersions at relatively low temperatures by mixing with a petroleum liquid a copolymer formed by conventional methods from specific combinations of a monomer which supplies an oil-solubilizing group and a monomer having nitrogen in an amine group or in an amide group. One difficulty, however, with these conventional copolymers has been their lack of reproducibility. Different lots of a copolymer from the same monomers may provide different degrees of dispersing activity. There have also been noted variations in stability of different lots of copolymers, but at best these conventional copolymers have not been always satisfactory on this score. Another fault of some conventionally formed copolymers has been a lack of resistance to shear, moisture, oxidation, and changes resulting from exposure to elevated temperatures which may be encountered in continuous operation of combustion engines of the various types. There is furthermore the question of compatibility of dispersants of the nitrogen containing copolymer type with many of the common additives used in oils. There is thus a need for improvements in additives which avoid as many of such difficulties as possible and which provide efficient dispersing action. Such improvements are made available in graft copolymers prepared according to the process of this invention.

The graft copolymers obtained by the process of this invention thus present many differences and advantages over copolymers obtained by the conventional methods of copolymerization wherein the comonomers are mixed, an initiator is supplied thereto, and polymerization of the mixture is effected. There are many combinations of comonomers which by conventional methods of polymerization give polymers exhibiting no dispersing action, and there are other combinations which by conventional methods yield copolymers having at best but mild dispersing action. Yet, these same combinations of comonomers can be copolymerized by the process of this invention to yield graft copolymers possessing definite, useful, dispersing action or dispersing action which is superior to that exhibited by conventionally formed copolymers and to do so more uniformly and regularly. The method of this invention has the further advantage that the graft copolymers therefrom can be based on the greatest variety and choice of starting materials.

Graft copolymers formed according to the process of this invention differ also from segmented copolymers which are formed by first polymerizing a monomer substantially completely and then continuing polymerization with a second or a second and then a third comonomer. One difference between segmented copolymers and the graft copolymers of this invention is brought out by the situation that some combinations of comonomers fail to provide a segmented copolymer exhibiting any dispersing action and yet nevertheless, these same monomers can be now used according to this invention to form graft copolymers having useful dispersing action. There is another situation wherein there are combinations of monomers which provide segmented copolymers having a mild degree of dispersing action. From these same monomers, graft copolymers can be formed according to the process of this invention which have unexpectedly good dispersing activity in petroleum liquids. There are other important differences between these types of copolymers which are directly related to their practical application, such as compatibilities, stabilities, resistance to heat, moisture, and resistance to shear.

MONOMERS FOR FORMING BASE POLYMER

The process of this invention has an advantage over previous processes in that it permits a considerable choice among the component monomers, at the same time encuring the production of highly desirable, uniform, and useful graft copolymers for additives as dispersants and detergents. The matter of choice applies to both the minor part of the copolymers obtained from one or more nitrogen-containing comonomers and the major part of the copolymers. The major part is obtained from one or more of the free-radically polymerizable, monoethylenically unsaturated compounds which give hydrocarbon-soluble polymers or from a mixture of free-radically polymerizable, monoethylenically unsaturated compounds, this major part of the final graft copolymer ensuring solubility of the final copolymer in petroleum liquids or synthetic lubricants. The monomers supplying this major part of the graft copolymers may be selected from a variety of types of free-radically polymerizable unsaturated compounds, chiefly those composed of carbon, hydrogen, and oxygen. For the most part, these are such as acrylic esters, vinyl esters, itaconic esters, and maleic and fumaric esters and mixtures of two or more of these various types. While allyl esters have been found also to provide a polymer-monomer mixture which can be further reacted with a nitrogen-bearing vinylidene compound, the final copolymers tend to be somewhat variable and low in molecular size. The main value of allyl monomers appears to be their use in conjunction with other types of esters which are more tractable and lead the whole copolymer to a higher degree of polymerization.

Among the most important monomers providing the major part of the final graft copolymer are esters of acrylic and methacrylic acids. At least one of these must contain a hydrocarbon substituent of sufficient size to provide solubility of the final graft copolymer in petroleum liquids. The size of this substituent may be varied somewhat with the nature of the liquid in which the copolymer is to be dissolved, with the compositions of the copolymer, and with the proportion of copolymer which is to be dissolved in the liquid. Particularly effective esters are alkyl acrylates and methacrylates or mixtures of such esters which have alkyl groups of an average size corresponding to at least eight carbon atoms. The chief solubilizing esters to be used contain such groups as octyl, 2-ethylhexyl, nonyl, 3,5,5-trimethyl, undecyl, dodecyl tetradecyl, hexadecyl, and octadecyl, and the like. Large alkyl groups, such as eicosyl or tetracosyl are also useful, even though less common. On the other hand, lower alkyl groups may also be present in a mixture wherein the average carbon content of all of the alkyl groups of the esters is at least eight. Thus, there may be used methyl acrylate or methacrylate, ethyl acrylate or methacrylate, propyl or isopropyl acrylate or methacrylate, the various butyl acrylates or methacrylates, amyl acrylates or methacrylates, hexyl acrylates or methacrylates, and heptyl acrylates or methacrylates. In addition, there may be used in mixtures with higher alkyl acrylates or methacrylates minor proportions of such cycle-containing esters as benzyl acrylate or methacrylate, cyclohexyl or cyclopentyl acrylate or methacrylate, dicyclopentyl acrylate or methacrylate, or phenyl or alkylphenyl acrylate or methacrylate. Other α-substituted acrylates may also be used, such as α-ethacrylates or α-phenylacrylates or α-chloroacrylates, but since these are not readily available and at present are relatively expensive, aside from the fact that they may have a slow rate of polymerization, there is little apparent advantage of going further into their use.

In the formation of the first polymer or copolymer there may be used an acrylic or methacrylic ester of a monohydric alcohol in which the non-hydrozyl portion or residue contains one or more hetero atoms, that is atoms other than carbon and hydrogen. The extent to which such an ester may be incorporated will depend upon the nature of the group, since the polymers which include units from one or more of these substituted esters must, of course, posses the needed solubility. In general, esters of this sort will constitute but a minor proportion of the total final copolymer.

The heteroatom may be oxygen, sulfur, phosphorus, or nitrogen, the last of course also sometimes serving to supply of improve dispersing activity in the final copolymer. Typical groups are ethoxyethyl, ethoxypropyl, ethoxybutyl, butoxyethyl, butoxybutyl, octoxyethyl, octoxypropyl, octoxyethoxyethyl, octoxypropoxyethoxyethyl, dodecyloxyethyl, butylphenoxyethyl, octylphenoxyethoxyethyl, cyclohexoxyethyl, cyclohexoxyethoxyethyl, benzoxypropyl, benzoethoxyethoxyethyl, butylbenzoxyethyl, tetrahydrofurfuryl, or tetrahydrofurfuryloxyethyl. Comparable thio-containing groups may likewise be used, such as butylthioethyl, octylthioethyl, or tetradecylthioethyl. Amino-containing residues may be illustrated with dimethylaminoethyl, dibutylaminoethyl, tert-octylaminopropyl, or dimethylaminoethoxyethyl. Another type of alcohol residue of the acrylic and other polymerizable esters may be illustrated by such groups as dibutylphosphitoethyl, 2-diethylphosphitopropyl, diethylphosphitobutyl, diethylphosphonomethyl, or 1-dibutylphosphonobutyl.

Vinyl esters of fatty acids can also be used as starting materials. The average size of the carboxylic portion thereof is selected to ensure solubility of the final copolymer in petroleum liquids, and in general a carboxylic residue of at least about eight carbon atoms or a mixture of such residues with an average carbon content of eight carbon atoms or more provides oil-solubility. This number may be somewhat less if the copolymer is to be dissolved in a fuel oil or may be desirable large if the copolymer is to be dissolved in a heavy oil; a principle which applies to the first polymer generally. The range of esters which find application varies from the acetate through such esters as butyrate, octaote, laurate, myristate, and stearate to acid groups having 20 to 24 carbon atoms. Small amounts of vinyl acetate or propionate are especially helpful in building up copolymers with such other monovinylidene compounds as, for example, itaconates or with fumarates, maleates, and similar polymerizable ethylenically unsaturated monomers.

Alkyl fumarates may, however, be polymerized without the presence of another polymerizable unsaturated compound, as may also alkyl itaconates. The alkyl substituents of such esters may contain one to 24 carbon atoms with the proviso that the average size of alkyl group in polymer formed with such ester is about eight or more and, of course, of sufficient size, as usual, to provide adequate solubility of the final copolymer prepared after addition of a polymerizable N-substituted monovinylidene compound.

Related to these esters are dialkyl maleates, which, however, as is known, can be copolymerized with a more readily polymerized monomer, such as an acrylic ester, a vinyl ester, or a styrene, including not only styrene itself, but ring-substituted vinylbenzenes or vinylnaphthalenes. Alkyl maleates readily copolymerize with one or more of these monovinylidene compounds. As is known, the equivalent effect of alkyl maleate is obtained by copolymerizing with maleic anhydride and at a later stage converting the maleic units to the ester form.

Again, the alcohol residues used in the mixture should be of sufficient average size, usually eight carbon atoms or more, to ensure solubility in hydrocarbon liquids for the ultimate graft copolymer containing nitrogen. The alkyl groups may again vary in carbon content from one upward, preferably one to 24.

It will be evident that the proportion of lower alkyl groups, that is, alkyl groups of less than eight carbon atoms, not only with respect to maleates, but also with regard to other esters, including acrylates, vinyl carboxylates, itaconates, fumarates, and the like, must be a minor one if the final copolymer is to be soluble in oils.

The permissible proportion of lower alkyl groups increases as average size of alkyl groups increases. Furthermore, in place of the alkyl group in maleates, fumarates, or itaconates, there may be used cyclic groups or heterosubstituted groups, as noted above in the discussion of acrylic esters, such groups being of particular interest in conjunction with higher alkyl groups in one or more of the polymerizable compounds and then only to the extent permitting oil-solubility of the final copolymer. The permissible proportion will vary somewhat with the choice of higher alkyl group or groups and the nature of the nitrogenous comonomer introduced in the final copolymer.

There may be copolymerized along with one or more of the above free-radically polymerizable compounds one or more other monovinylidene compounds, such as styrene, vinyltoluene or other styrene having an alkyl group on the ring, or p-chlorostyrene, which monomers by themselves may not provide polymers of sufficient solubility in petroleum liquids. Likewise, small proportions of acrylinitrile or methacrylonitrile may be used in forming the copolymers, provided other comonomers are used therewith to provide the necessary solubility.

Also, small proportions of vinyl ethers and vinyl thioethers may be copolymerized with the above esters, mixture of esters, or mixture of esters and other polymerizable monovinylidene compound. Although vinyl ethers by themselves are not particularly amenable to free-radical polymerization, the enter into copolymers under the influence of free-radical initiator. Thus, there may be used in minor proportions, as from 1% to about 20%, such compounds as butyl vinyl ether, butyl vinyl thioether, octyl vinyl ether, dodecyl vinyl ether, or tetradecyl vinyl thioether. Similarly, vinyl ketones can be used to form copolymers. Furthermore, small proportions of vinyl chloride and vinylidene chloride are permissible, again if other comonomers are combined therewith to ensure proper solubility. As will be clear from this disclosure, the greatest variety of polymerizable monoethylenically unsaturated compounds can be used to form the first polymers upon which additional polymer units are formed from the nitrogen-containing comonomers.

When one or a mixture of such polymerizable monoethylenically unsaturated compounds has been polymerized to the extent of about 40% to about 85% (by weight), there is then copolymerized therewith a polymerizable nitrogen-containing monovinylidene compound, such compound being supplied to the polymerizing mixture to an extent between about 1% and about 30% by weight of the final copolymer formed therewith. The most useful or desirable proportions of a nitrogen-containing monovinylidene compound will vary with the particular type of such compound and the polymerizable ester or esters used in forming the copolymer. Thus, when vinyl lactams are copolymerized, the preferred proportions are between about 2% and about 20%, although these comonomers continue to supply dispersing activity up to about 30%. With acrylic amides preferred proportions are from about 5% to 20%, while with N-vinyl imides and amides, proportions between 3% and 25% seem desirable, the best ranges depending in part on the particular N-vinyl compound. When vinyl amines, N-vinyl-N-aminoalkylamides, or aminoalkyl acrylates and methacrylates are copolymerized, preferred proportions of these are between about 1% and 15%, for while larger proportions of amino-containing compounds may be used, the resulting graft copolymers may sometimes become incompatible with some commonly used oil additives. Again, some of the nitrogenous comonomers, particularly those of relatively large molecular weight or with bulky or hindering groups, may require relatively greater proportions, for example 10% to 30% for development of good dispersing activity in the final copolymer. Unexpectedly, such incompatibilities are reduced or in some cases even absent when the final graft copolymers are prepared according to the process of this invention. This is particularly true when the proportions of amino compounds are held within limits.

NITROGEN-CONTAINING COMONOMERS

Of the polymerizable nitrogen-containing monovinylidene compounds the N-vinyl lactams form an especially significant sub-class. An interesting consideration applying to these is that while N-vinyl pyrrolidinone copolymerizes with acrylic esters or mixtures of acrylic esters with other polymerizable monovinylidene compounds to give by conventional copolymerization methods copolymers which supply very good dispersing activity to solutions thereof in petroleum liquids, otherwise similar copolymers utilizing caprolactams or N-vinyl piperidone are deficient or even lacking in this activity. Yet these other lactams now become quite effective in copolymers made by the process of this invention. Various N-vinyl pyrrolidinones with C-alkyl groups are much more effective in providing dispersing activity when copolymerized according to the process of this invention than when copolymers are made according to the conventional methods. Also, the substituted vinyl pyrrolidinones become much more effective and larger substituents may be present than was formerly practical.

Useful lactams may be summarized by the formula

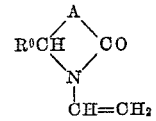

where R⁰ is an alkyl group of 1 to 4 carbon atoms, or more usually a hydrogen atom, and A represents an alkylene group supplying two to four carbon atoms between the

group and the =C=O group and having a total of two to about ten (or even more) carbon atoms, the alkylene group being straight-chained or branched. Typical N-vinyl lactams include N-vinyl pyrrolidinone itself, N-vinyl piperidone, N-vinyl caprolactam, N-vinyl-3-methyl pyrrolidinone or piperidone, or caprolactam, N-vinyl-4-methyl pyrrolidinone, or piperidone or caprolactam, N-vinyl-5-methyl pyrrolidinone or piperidone, N-vinyl-3-ethyl pyrrolidinone, N-vinyl-3-butyl pyrrolidinone, N-vinyl-3,3-dimethyl pyrrolidinone, N-vinyl-4,5-dimethyl pyrrolidinone, N-vinyl-5,5-dimethyl pyrrolidinone, N-vinyl-3,3,5-trimethyl pyrrolidinone, N-vinyl-5-methyl-5-ethyl pyrrolidinone, N-vinyl 3,4,5-trimethyl-3-ethyl pyrrolidinone, N-vinyl-6-methyl-2-piperidone, N-vinyl-6-ethyl-2-piperidone, N-vinyl-3,5-dimethyl - 2 - piperidone, N-vinyl-4,4-dimethyl-2-piperidone, N-vinyl-6-butyl piperidone, N-vinyl-7-methyl caprolactam, N-vinyl-7-ethyl caprolactam, N-vinyl-4-isopropyl caprolactam, N-vinyl-4-butyl caprolactam, N-vinyl-5-tert-butyl caprolactam, N-vinyl-3,5-dimethyl caprolactam, N-vinyl-4,6-dimethyl caprolactam, N-vinyl-3,5,7-trimethyl caprolactam, or N-vinyl-2-methyl-4-isopropyl caprolactam. Comparable compounds are available from the corresponding thiolactams and these can be used in the process of this invention.

Another type of vinylated heterocycles comprises the N-vinyl oxazolidones (cf. J. Org. Chem. 22, 849 (1957)), which have the structure

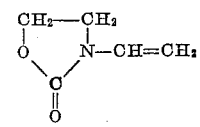

One or both of the CH₂ groups of the ring may be substituted with alkyl groups. The corresponding six-membered ring will also provide effective N-vinyl comonomers.

Another subgroup comprises cyclic N-vinyl imides, such as N-vinyl succinimide, N-vinyl-α-methylsuccinimide, N-vinyl-α,β-dimethyl-succinimide, N-vinyl-α-amylsuccinimide, N-vinyl phthalimide, N-vinyl diglycolylimide, or N-vinyl hexahydrophthalimide. These compounds may be summarized by the formula

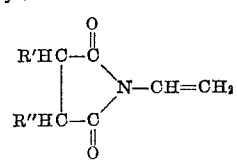

where R' and R" are lower alkyl groups of 1 to 5 carbon atoms or hydrogen or together with the carbon atoms to which they are attached are parts of a carbocycle.

A different but related type of comonomer includes N-vinyl ureas which have an N-substitutent which serves to stabilize these vinyl compounds. Typical examples are N-vinyl ethyleneurea, N-vinyl N,N'-diphenylurea, or N-vinyl-N'-(β-dimethylaminoethyl)ethyleneurea.

Another interesting subclass of nitrogenous comonomers comprises N-vinyl carboxylic amides, such as N-vinyl-N-methyl benzamide, N-vinyl-N-methylhexahydrobenzamide, N-vinyl-N-methylacetamide, N-vinyl-N-ethylacetamide, N-vinyl-N-phenylbutyramide, N - vinyl - N-methyloctamide, N-vinyl-N-methyllauramide, and homologues and isomers of these. Compounds of this type may be summarized by the structure

CH₂=CH-N(Y)COR+ where R+ is an alkyl, phenyl, or cycloalkyl group and Y is hydrogen or a hydrocarbon group, such as phenyl or alkyl, which provides preferred compounds of this subclass.

Another type of polymerizable heterocyclic vinylidene comonomer comprised compounds of the formula

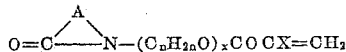

where A is an alkylene group of three to about twelve carbon atoms with three to five carbon atoms of this group in a chain between the O=C group and N, $x$ has a value of one to four or more, $n$ is an integer from one to four when $x$ has a value of one and is an integer from two to four when $x$ has a value above one, and X is hydrogen or the methyl group. Typical compounds are N-acryloxyethyl pyrrolidinone, piperidone, or caprolactam, N-methacryloxyethyl pyrrolidinone, piperidone or caprolactam, N-methacryloxyethoxyethyl pyrrolidinone, N-methacryloxypropyl pyrrolidinone, piperidone, or caprolactam, N-methacryloxyethyl - 3 - methylpyrrolidinone, methacryloxymethyl pyrrolidinone, piperidinone, or caprolactam, N-methacryloxyethyl-3-butylpyrrolidinone, N - methacryloxyethyl-3,3-dimethylpyrrolidinone, N - methacryloxyethyl - 3,3,5 - trimethylpyrrolidinone, N-methacryloxypropyl-6-methylpiperidone, N-methacryloxyethyl-7-methylcaprolactam, or N-methacryloxyethyl-4-isopropylcaprolactam.

Related to the above compounds are acrylamido- or methacrylamido-alkyl pyrrolidinones, piperidones, and caprolactams,

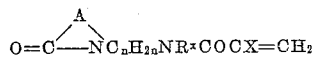

wherein A is an alkylene group of three to about 12 carbon atoms with three to five carbon atoms in a chain between the C=O group and N, $n$ is an integer from two to three, X is hydrogen or methyl, and $R^x$ represents hydrogen or an alkyl or phenyl group. Typical compounds of this type are N-methacrylamidopropyl pyrrolidinone, piperidone, or caprolactam, or N-(N-phenylacrylamidopropyl)pyrrolidinone, piperidone, or caprolactam, methacrylamidomethyl - 1,3,3,5 - tetramethylpyrrolidinone, or N-(2 - acrylamidoethyl)pyrrolidylpropylacrylamide.

Compounds of this type may be prepared by reacting acryloyl or methacryloyl chloride or bromide with an N-(aminoalkyl)-lactam, conveniently in the presence of a base to take up hydrogen halide.

Polymerizable compounds similar to the above are prepared by reacting N-hydroxyalkyl oxazolidones with methacryloyl or acryloyl chloride or bromide in the presence of an alkaline agent to take up hydrogen halide, such as sodium or potassium carbonate or bicarbonate, pyridine or dimethylaniline. In another method the N-hydroxyalkyl oxazolidone is reacted with an acrylic ester in the presence of a transesterification catalyst, such as tetraisopropyl or tetrabutyl titanate. When an alkyl methacrylate with an alkyl group of one to four carbon atoms is reacted with the hydroxyalkyl compound, there may be used as catalyst an alkali metal alkoxide, such as sodium or potassium hydroxide. It should be further noted that hydroxyethyl oxazolidone and similar hydroxyalkyl oxazolidones may be reacted with an alkylene oxide, such as ethylene oxide or propylene oxide to provide ethoxy or propoxy groups in much the same way as shown above for the lactams and these converted as above to methacrylates and acrylates.

Furthermore, the known N-chloroethyl oxazolidone may be converted to the aminoethyl compound in the conventional way and the resulting N-aminoethyl oxazolidone reacted with acryloyl or methacryloyl chloride or bromide to give acrylamidoethyl- or methacrylamido-ethyl-oxazolidone, the procedure being as shown above for making the acrylamidoalkyl lactams.

Another type of amide is obtained by reacting a lactam

the significance of A being as above defined with acryloyl or methacryloyl chloride or bromide in the presence of a basic material for taking up hydrogen halide, such as sodium or potassium carbonate or pyridine or dimethylaniline to give an amide having the structure

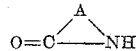

in which X represents hydrogen or the methyl group. The procedure is essentially the same as discussed above for comparable reactions. For example, N-methacryloylpyrrolidinone is obtained and distills at 93°–103° C./1.2–1.7 mm., while N-acryloylpyrrolidinone distills at 85°–90° C./1–2 mm.

Yet another type of carboxylic amide may be used in the process of this invention. In these amides the polymerizing group is in the acid portion of the molecule, thus $R^1R^2NCOC(X)=CH_2$ wherein $R^1$ and $R^2$ taken individually represent hydrogen or cycloalkyl, aralkyl, or 1 to 4 carbon atom alkyl groups and X represents hydrogen or the methyl group. Typical compounds are acrylamides and α-methacrylamides, such as the N-methyl, N,N-dimethyl, N,N-dibutyl, N-butyl, N-2-ethylbutyl, N-2-ethylhexyl, N-octyl, N-methyl-N-octyl, N-dodecyl, N-hexadexyl, N-octadecyl, N-cyclopentyl, N-cyclohexyl, N-cyclohexyl-N-methyl, N-benzyl, N,N-dibenzyl, N-butylbenzyl, N-benzyl-N-methyl acrylamides and methacrylamides. The groups $R^1$ and $R^2$ may also be taken together to form a divalent saturated aliphatic chain of 4 to 5 atoms having the formulas

—CH₂CH₂OCH₂CH₂—

CH₂CH₂CH₂CH₂CH₂—, and —CH₂CH₂CH₂CH₂—, which, with the nitrogen, gives the heterocycles morpholino-, piperidino-, or pyrrolidino-acrylamide or methacrylamides.

Another type of nitrogenous comonomer which on delayed addition gives dispersant graft copolymers, comprises N-vinyl amines

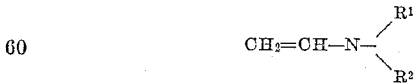

where $R^1$ and $R^2$ individually are cycloalkyl, alkyl of 1 to 12 carbon atoms and phenyl and also one of these may be hydrogen. Typical vinylamines are N-vinyldiethylamine, N-vinyldipropylamine, N-vinyldibutylamine, N-vinyldihexylamine, N-vinylmethyldodecylamine, N-vinyldidodecylamine, N-vinylcyclohexylamine, or N-vinylmethylphenylamine. When $R^1$ and $R^2$ are taken together, they form a divalent aliphatic chain of four to five atoms, which, with the nitrogen, provides a heterocycle, as in N-vinylpiperidine, N-vinylmorpholine, and N-vinylpyrrolidine. Instead of N-vinyl heterocyclic amines there may be used N-vinyloxyalkyl amines.

Rather closely related to the above compounds are the vinylpyridines and alkyl vinyl substituted pyridines having an alkyl substituent of 1 to 2 carbon atoms, which are also useful in providing final coplymers with good dispersing action. There may specifically be mentioned by way of illustration 2-vinylpyridine, 4-vinylpyridine, mixtures of vinylpyridines, 2- or 4-vinyl-3-methylpyridine, and 2- or 4-vinyl-5-ethylpyridine.

A very interesting class of copolymerizable nitrogen compounds comprises amino-substituted styrenes, such and 2- and/or 4-aminostyrene, dimethylaminostyrene (chiefly para), diethylaminostyrene, dimethylaminomethylstyrene, diethylaminomethylstyrene, piperidinomethylstyrene, pyrrolidinomethylstyrene, or morpholinomethylstyrene, the latter type being available from the reaction of chloromethylstyrene and secondary amines.

Yet another kind of vinyl compound supplying the essential nitrogen of the type here required comprises aminoalkyl vinyl ethers and thioethers in which the aminoalkyl group contains 2 to 5 carbon atoms, such as dimethylaminoethyl vinyl thioether, diethylaminoethyl vinyl thioether, dimethylaminobutyl vinyl thioether, dimethylaminopropyl vinyl thioether, morpholinoethyl vinyl thioether, or pyrrolidinoethyl vinyl thioether.

Also within this class fall the N-vinyloxyalkyl cyclic amines, ureas, oxazolidones, and lactams which are comparable to the acrylyl derivatives shown above.

When vinyl ethers are used as comonomers, they enter into free radical copolymerization within the proportions here found effective even though they do not always undergo free radical polymerization by themselves. There thus may be used ethers comparable to the above thioethers. Thus, there may be used dimethylaminoethyl vinyl ether, methylaminoethyl vinyl ether, β-aminoethyl vinyl ether, diethylaminoethyl vinyl ether, dimethylaminobutyl vinyl ether, methylaminopentyl vinyl ether, piperidinoethyl vinyl ether, morpholinoethyl vinyl ether, or pyrrolidinopropyl vinyl ether.

There is another distinct subgroup which combines several kinds of functional substituent groups, as in N-vinyl-N-(dimethylaminoethyl)amine, N - vinyl - N-(dimethylaminoethyl)propionamide or lauramide, N-methyl-N-(dimethylaminoethyl)acrylamide or methacrylamide, N-(diethylaminopropyl)acrylamide or methacrylamide, or N-(dibutylaminoethyl)acrylamide or methacrylamide.

As with polymerizable amides, the unsaturated linkage may be shifted from direct attachment to nitrogen to an acid residue, as in aminoalkyl acrylates and methacrylates in which the alkyl group contains 4 to 26 carbon atoms, typical of which are dimethylaminoethyl, diethylaminoethyl, dibutylaminoethyl, dicyclohexylaminoethyl, dimethylaminopropyl, dibutylaminopropyl, dimethylaminobutyl, diethylaminobutyl, tert-butylaminoethyl, tert-butylaminopropyl, tert-octylaminoethyl, tert-nonylaminoethyl, tert-alkylaminoethyl, where the alkyl group corresponds to a mixture of groups from tert-dodecyl to tert-pentadecyl, or, a mixture of groups from $C_{18}$ to $C_{24}$, tert-alkylaminopropyl, where the alkyl groups are as described for tert-alkylaminoethyl just above, 7-amino-3,7-dimethyloctyl esters of acrylic and methacrylic acid.

Another subclass of interest comprises aminoalkyl acrylates and methacrylates in which the amino function is part of a heterocycle as in pyrrolidinoethyl, piperidinoethyl, morpholinoethyl, pyrrolidinopropyl, piperidinobutyl acrylate or methacrylate.

Polymerizable hydrazides form an especially important class of nitrogenous comonomers. When a hydrazine is reacted with a methacryloyl halide, for example, in the presence of an acceptor for hydrogen halide, such as pyridine or sodium bicarbonate, a methacryloyl hydrazide is formed which will enter into copolymerization with the monomer-polymer mixture formed from a starting polymerizable monoethylenically unsaturated ester. Particularly useful are such compounds as N-methacrylyl-N',N'-dimethyl hydrazide or N-methacrylyl-N',N' - di- butylhydrazide. Similarly, acrylic amides may be formed from 1-aminopyrrolidine, 1-aminopiperidine, or 1-aminomorpholine, such as $CH_2=C(CH_3)CONHN=C_4H_8$ or $CH_2=C(CH_3)CONHN=(C_2H_4)_2O$. Another subclass of hydrazine derivatives comprises the acrylic esters of 1-hydroxy alkyl-2,2-dialkylhydrazines or the corresponding 1-N-hydroxy alkylaminopyrrolidine, 1-N-hydroxyalkylaminopiperidine, or 1-N-hydroxyalkylaminomorpholine, especially where the alkyl group is ethyl or propyl, such as N-methacrylyoxyethyl-N', N'-dimethylhydrazine, 1-N-(β-methacryloxyethyl)aminopiperidine, 1-N-(β-methacryloxypropyl)-N',N'-dibutylhydrazide or 1-N-(3-methacryloxypropyl)pyrrolidine.

The N-hydroxyalkyl hydrazines can also be vinylated by reaction with acetylene by conventional methods to give corresponding vinyl ethers. These ethers also enter copolymerization when used according to the process of this invention.

There is a related small group of nitrogen-containing comonomers which should be mentioned. This group may be considered in general equivalent to the monovinylidene compounds containing a trivalent nitrogen even though the unsaturation is not terminal. Nevertheless, these imides belong to the class of monoolefinically unsaturated compounds and are capable of entering into copolymers, particularly by the method of this invention. Typical examples are N-methylmaleimide, N-ethylmaleimide, N-butylmaleimide, N-octylmaleimide, N-dodecylmaleimide, N,2-dimethylmaleimide, N-butyl-2-methylmaleimide, and so on. This type requires that somewhat more of it be used in a graft copolymer to provide good dispersing action and the amount added to form the final polymer should be from above 5% to about 35% by weight.

In short—any polymerizable monovinylidene compound which contains one or more trivalent nitrogen atoms substituted with at least two different substituents attached thereto can be used to develop dispersing activity for the final graft copolymer when this nitrogen-containing comonomer is supplied to a partially polymerized and polymerizing reaction mixture and copolymerization is continued.

METHOD OF COPOLYMERIZATION

The process of this invention is started by subjecting at least one free radically polymerizable monoethylenically unsaturated compound having an oil-lubricating group to the action of a free radical polymerization initiator under polymerizing conditions, causing from 40% to about 85% of said compound to polymerize, adding to the resulting mixture of said compound and polymer a polymerizable monovinylidene compound containing trivalent nitrogen which carries at least two different substituents, and copolymerizing said mixture and said compound containing trivalent nitrogen under the influence of a free radical initiator.

The range of temperatures for effecting polymerization varies from about 60° to about 150° C., depending in part upon the choice of initiator. So-called azo catalysts or initiators generate free radicals at even lower temperatures than 60° C. for some compounds, particularly in actinic light, and may be used conveniently up to about 130° C. Peroxidic initiators are generally used within the range of about 65° C. to 150° C., the optimum temperature range depending upon well-known factors, such as choice of initiator, its concentration, nature of solvent present, and the like.

Typical initiators include dimethyl azodiisobutyrate, azodiisobutyronitrile, azobisdimethylvaleronitrile, azodiisobutyramide, azobis(α-ethylbutyonitrile), or azobis(α,γ-dimethyl-capronitrile), the azo group being cyclic and bonded to aliphatic tertiary carbons.

Peroxidic initiators include acetyl peroxide, benzoyl peroxide, caproyl peroxide, lauroyl peroxide, dibenzal peroxide, di-tert-butyl perphthalate, tert-butyl perbenzoate, 2,2-bis(tert-butylperoxy)butane, methyl ethyl ketone peroxide, tert-butyl hydroperoxide, or cumene hydroperoxide. With the hydroperoxides it is desirable to use a promoter, such as a quaternary ammonium salt, typical of which are octyltrimethylammonium chloride, dodecylbenzyldimethylammonium bromide, cetylpyridinium chloride, didodecenyldimethylammonium chloride, dodecenylbenzyldimethylammonium chloride, octylbenzyltrimethylammonium chloride or diisobutylphenoxyethoxyethylbenzyldimethylammonium chloride.

The amount of initiator may vary from about 0.01% to about 5% of the weight of the comonomers. Usually part of the initiator is supplied at the start and/or during the formation of the first polymer; additional initiator is supplied when the nitrogen-containing comonomer is added and generally it is desirable to continue addition of initiator in small proportions until copolymerization is substantially complete—that is, until 80% to 100% of the comonomers have combined.

When promoter or activator is used, such agent is usually supplied in a proportion from about 5% to 20% of the weight of the initiator.

After copolymerization has been carried to a good degree of conversion, any free initiator present may be decomposed if so desired by heating the product obtained at temperatures of 100° to 200° C., a range of 130° to 150° C. being preferred. This step may be omitted or it may be made part of the procedure conveniently at a late stage in which volatile material is stripped off by heating, desirably under reduced pressures. Another way of disposing of free initiator in the copolymer comprises precipitating the copolymer as by mixing a solution of the copolymer with an organic solvent which is a nonsolvent for the copolymer such as methanol. The precipitated copolymer may be washed with a volatile nonsolvent and dried.

While it is possible to prepare copolymers by bulk polymerization, there are advantages in forming and handling copolymers in solvents. At the start, monomer may act as solvent for polymer as it forms and addition of a different organic solvent for polymer is not so important as at later stages. Since presence of a solvent, however, makes stirring practical and aids in solution of the final copolymer in the vehicle in which it is to be used, it is best to use an organic solvent to take up both the first polymer and the final copolymer. It may be a readily volatilizable organic liquid, such as benzene, toluene, or xylene, or a solvent naphtha. The solvent may also be a petroleum liquid of the sort which would be used in preparing an article of commerce, such as fuel oil or lubricating oil. Thus, there may be used as solvent kerosenes or fuel oils or lubricating oils. It is desirable, however, that these be low in or free of contaminants which may interfere with polymerization. These occur at times in heavy oils or residual oil substances of unidentified composition which delay or interfere with good polymerization. Purified mineral oils are, however, devoid of interfering contaminants. Distilled oils, known as neutrals, are also generally free of interfering or troublesome amounts of such contaminants.

Other organic solvents, both volatile, and relatively nonvolatile, may also be used. Interesting examples of these are esters and include such carboxylic esters as butyl acetate or amyl acetate, dibutyl sebacate, dioctyl adipate, dioctyl sebacate, dioctyl azeleate, or ditetradecyl sebacate, tributyl phosphate, or tricresyl phosphate, silicate esters, silicone fluids, or other organic liquids in which it may be desired to use the copolymers prepared by the process of this invention.

If a volatile liquid is used, the final graft copolymer may be taken up in the kind of vehicle which will be acceptable in the ultimate product. Thus, when a copolymer is prepared in toluene, for example, the toluene solution of copolymer may be used by addition to a fuel oil to be stabilized, or the toluene solution may be mixed with a mineral oil and the toluene then stripped from the mixture by heating, best under reduced pressure, a step which also disposes of traces of initiator. A concentrated solution of copolymer in mineral oil can be readily incorporated into any desired lubricating oil. Again, when the graft copolymer is made in a diester or is taken up as a concentrate in a diester, the resulting solution of copolymer is particularly suitable for addition to synthetic lubricants based on diesters such as the dialkyl sebacates.

DISPERSANCY TEST

A practical laboratory method for determining the dispersing activity of any given polymer is based on the capacity of this polymer to disperse asphaltenes in a typical mineral oil.

The asphaltenes are obtained by oxidizing a naphthenic oil with air under the influence of a trace of iron salt as catalyst, such as ferric naphthenate. The oxidation is desirably accomplished at 175° C. for 72 hours by passing a stream of air through a naphthenic oil. Pentane is added to the cooled, oxidized oil to form a sludge which may be separated by centrifuging. The sludge is freed from oil by extracting it with pentane. It is then taken up with chloroform and the resulting solution is adjusted to a solids content of about 2% (wt. per vol.).

When a polymer is to be examined for its dispersing activity, it is dissolved in a standard oil, such as a solvent-extracted 100 neutral. Blends may be prepared to contain percentages varying from about 2% to 0.01% or even lower of polymer in oil.

A 10 ml. sample of a blend is treated with 2 ml. of the standard solution of asphaltenes in chloroform. The sample and reagent are thoroughly mixed in a test tube and the tube is placed in a forced draft oven at 150° C. for two hours to drive off volatile material. The tube is then allowed to cool and the appearance of the sample is noted.

If the polymer has dispersing activity, the oil will appear clear although colored. The appearance may then vary from being hazy or turbid to the state in which suspended particles appear, and finally to the point where the asphaltenes appear in a flocculent state. The polymers are rated accordingly.

Experience has demonstrated that, unless a polymer exhibits dispersing activity at concentrations below about 2% in the above test, it will fail to improve the cleanliness of engine parts in actual engine tests such as the CRC FL-2 test. In such engine tests, various engine parts are rated for cleanliness, and by combining the ratings for the parts, a total score between zero and 100 is obtained, 100 being a perfect score.

DETERMINATION OF POLYMER

For determining the content of polymer during the polymerization process and also for precisely determining the content of copolymer in the final product, essentially the same method may be used. This method depends upon precipitation of polymer and removal therefrom of monomers and solvent.

About a one-gram sample is taken. It is dissolved in 5 ml. of benzene. The resulting solution is mixed with 15 ml. of methanol. Polymer precipitates. It is centrifuged from the organic solvents, which are decanted from the centrifuged polymer. The polymer is taken up in benzene and reprecipitated with methanol. These steps are repeated until pure polymer is obtained. A total of five precipitations is sufficient. The centrifuged polymer is finally taken up with a little pentane, the resulting solution is filmed on the inner walls of a tared tube, and the tube is heated, this being done in a forced-draft oven at 150° C. for 15 minutes. The weight of polymer is then measured and from the weight sample, the polymer content is readily calculated.

13

Further details of the preparation of copolymers according to the process of this invention are presented in the following examples. These are given by way of illustration and not for purposes of limitation. Parts shown therein are by weight unless otherwise designated.

*Example 1*

(a) Apparatus is provided equipped with an efficient stirrer, a thermometer, inlet and outlet tubes for gas, and a device for admitting reactants. The apparatus is swept with nitrogen and a slow current of this gas is maintained during the entire polymerization cycle.

There are mixed in a tank 4500 parts of pure cetyl-stearyl methacrylate, 5700 parts of pure lauryl-myristyl methacrylate, and 1800 parts of pure butyl methacrylate. To this mixture there is added with stirring 750 parts of a 50% diisopropylbenzene hydroperoxide solution in alcohol.

There is separately prepared a mixture of 1880 parts of 96% pure lauryl-myristyl methacrylate, and 1200 parts of N-vinyl pyrrolidinone. To this mixture there are added 120 parts of a finely divided filter-aid such as diatomaceous earth. The mixture is stirred and filtered. To the filtered, clear mixture there is added 75 parts of a 50% diisopropylbenzene hydroperoxide solution in alcohol.

The apparatus is flushed with dry nitrogen and charged with 4500 parts of white mineral oil. There is then added a charge of 3825 parts of the first mixture of monomers. There is then supplied a solution of 37.5 parts of octylphenoxyethoxyethylbenzyldimethylammonium chloride in butanol. This charge is heated and stirred to about 100° C., at which temperature polymerization begins. Heating is discontinued but the temperature of the reaction batch rises to over 120° C. and then gradually falls to about 110° C. Reaction time is counted from the moment that the temperature of 100° C. is attained. Twenty minutes later, addition of the rest of the first mixture of monomers is begun at a rate of about 93 parts per minute.

After all of the first mixture of monomers has been admitted and the mixture stirred, there is taken a sample which is analyzed for its polymer content. In this particular preparation the polymer content is found to be about 80%. At this time the second mixture of monomers is slowly added to the apparatus over a period of 15 minutes. The temperature of the mixture increases to about 125° and then decreases slowly. From time to time there are added small portions of diisopropylbenzene hydroperoxide solution and of the above-noted quaternary ammonium chloride. Reaction is continued for a total time of seven hours. During this time the total amount with hydroperoxide added amounts to 4% of the weight of monomers while the weight of the quaternary ammonium chloride is 1/10 of this. The relatively high proportion of hydroperoxide here is used to provide a copolymer of relatively low molecular weight.

Volatile materials are removed from the reaction mixture by sparging with nitrogen while the mixture is held at 115°–125° C. for 15 hours. The product thus obtained is a solution of graft copolymer in oil. Analysis of this solution by precipitation of graft copolymer shows a polymer concentration of 53.5% by weight. The solution has a viscosity of 169 centistokes at 210° F. It is designated by the identification number W290S.

When this polymer solution is added to typical lubricating oils and the resulting blends are tested for dispersing asphaltenes, it is found to give clear solutions, even dilutions as low as 0.125% of graft copolymer, showing high dispersing activity.

Engine test data for oils containing the above graft copolymers are in agreement with the above tests for dispersing actions. These data are obtained according to the standard FL-2 method, using a Chevrolet engine. In order to make valid comparisons the same fuel is used in any series of tests and also the same base oil. The base oil is a good quality lubricating oil containing an oxidation-corrosion inhibitor.

Control runs are made with the base oil and evaluations are made with blends of the base oil and copolymer.

In the case of the above copolymer W290S, there were prepared blends at 0.7% of copolymer and 1.78% of copolymer, identified as blends 2071 and 2072 respectively.

These blends were used in FL-2 engine tests and FL-2 tests were made in which the base oil without copolymers was used. Furthermore, tests were made with a blend of the base oil and a conventionally prepared copolymer from comonomers mixed in the same proportions used above and then copolymerized together. This blend is identified as 2096.

The results of these engine tests are summarized in Table I. Ratings as there given are for total varnish on a 0 to 20 score, 20 being perfect, and for total sludge on a 0 to 80 score, 80 being perfect. It will be recognized that these two totals are based on the sum of scores for various parts, two being combined for the varnish rating and eight for the sludge rating. The overall ratings combine, then, the scores for ten items and are far more significant than any individual score taken alone.

TABLE 1.—FL-2 ENGINE TEST DATA

| Blend No. | Ratings | | | |
| --- | --- | --- | --- | --- |
|  | Concentration, percent | Varnish | Sludge | Overall |
| 2071 | 0.7 | 14.8 | 71.4 | 86.2 |
| 2072 | 1.78 | 12.8 | 75.4 | 88.2 |
| Base Oil | | 5.4 | 48.5 | 53.9 |
| 2096 | .7 | 7.2 | 59.3 | 66.5 |

The data demonstrate that the conventionally formed copolymer gives a definite improvement in cleanliness of both oil and engine parts, as reflected in the rating of 66.5 at 0.7% as compared to 53.9 for the base oil without dispersant. Yet the same comonomers can be copolymerized according to the process of this invention to provide a dispersant of even greater effectiveness.

There was prepared a blend of dioctyl sebacate and a similar polymer solution to contain 0.25% of this copolymer. It effectively dispersed 0.4% asphaltenes. This is a most marked improvement over a copolymer made by the conventional polymerization process, for when 2.0% of this latter copolymer was blended in dioctyl sebacate, the resulting blend failed to disperse 0.4% of asphaltenes.

*Example 2*

(a) A reaction vessel was flushed with nitrogen and heated to 110° C. by means of an oil bath. A monomeric mixture was prepared consisting of 169 parts of stearyl methacrylate, 112.5 parts of lauryl methacrylate, 144.5 parts of n-butyl methacrylate, 22.5 parts of white mineral oil, and 0.56 parts of benzoyl peroxide. While the polymerization vessel was maintained at 110–125° C., all of this monomeric mixture except 33.7 parts was charged to it with stirring over a period of 1.7 hours. At 1.7 hours, an aliquot was removed from the reaction vessel and analyzed by the method described above. Analysis showed that the copolymer yield was 78% based on the methacrylic ester charged. To the 33.7 parts of the remaining monomeric mixture was added 45 parts of N-vinyl pyrrolidinone and the resulting mixture was charged to the reaction vessel during 0.17 hour. After 4.0 hours, the temperature of the vessel was allowed to fall to 106° C., at which level it was maintained until a total of 7.2 hours had elapsed. Benzoyl peroxide was added as follows: at 2.7 hours, 0.112 part; at 4 hours, 4.67 hours, 5.33 hours, and 6.0 hours, 0.17 part, respectively. Additions of 22.5 parts of white mineral oil were made at 2.7 hours and 4 hours. Additions of 22.5 parts of 100 SUS viscosity neutral oil were also made at 5.33 and 6 hours. At 6.5 hours, 840 parts of this neutral oil was added. The product was then heated to 140° C. under reduced pressure and kept at 135–141° C./2 mm. for 1 hour to give 1422 parts of an oil solution containing 28.5% of graft copolymer. It gave a flash point (Cleveland Open Cup) of 400° F. Its viscosity was 296 centistokes at 210° F. When this graft copolymer was tested for dispersancy of asphaltenes, an oil blend containing 0.125% copolymer dispersed 0.4% asphaltenes readily. This was a significant improvement in dispersancy compared to the dispersancy provided by a copolymer made in the normal manner by mixing together all of the methacrylic esters with all of the N-vinyl pyrrolidinone, which conventional copolymer required a concentration of 2% to pass the detergency test.

(b) The above procedure was followed with the same materials except azodiisobutyronitrile was substituted in place of benzoyl peroxide as the polymerization initiator. Analysis of the aliquot removed from the reaction vessel at 1.7 hours indicated an 81% copolymer yield of the methacrylic esters charged at that time, whereupon the remaining monomeric mixture and vinyl pyrrolidinone were added and polymerized. The quantity of azodiisobutyronitrile used totaled 1.3 parts. The stripped oil solution of the copolymer weighed 1429 parts. It contained 28.4% of graft copolymer. At 210° F., its viscosity was 278 centistokes. Oil blends of this graft copolymer at low concentrations showed excellent performance against asphaltenes. In comparison, a copolymer made in the conventional manner from a monomeric mixture containing all the N-vinyl pyrrolidinone at the start required about 8 times as much copolymer to provide good detergency in the same oil.

(c) The procedure described under part (a) was followed in general using the same materials except that diisopropylbenzene hydroperoxide and diisobutylcresoxyethoxyethyl dimethyl benzyl ammonium chloride were employed as the initiator-promoter system and the N-vinyl pyrrolidinone was added after the initial polymerization had reached about 61%. Because of the nature of this catalyst system used, the procedure differed slightly in order to handle the promoter separately. A monomeric mixture was prepared consisting of 169 parts of stearyl methacrylate, 112.5 parts of lauryl methacrylate, 144.5 parts of n-butyl methacrylate, 22.5 parts of white mineral oil, and 1.06 parts of a diisopropylbenzene hydroperoxide solution which contained 52.8% active peroxide ingredient. One quarter of this mixture was charged to the polymerization vessel and heated in an atmosphere of nitrogen with stirring to 110° C., whreupon 0.224 part of butanol containing 0.056 part of diisobutylcresoxyethoxyethyl dimethyl benzyl ammonium chloride was added. Ten minutes were allowed for the initial exothermic reaction, then the remaining 75% of the monomeric mixture was charged to the polymerization vessel over a period of 1.7 hours with a batch temperature of 112–115° C. Analysis of an aliquot of the reaction mixture at 2.5 hours by the procedure described in Example 1 showed the copolymer yield to be 61%. Another monomeric mixture consisting of 45 parts of N-vinyl pyrrolidinone mixed with 11.25 parts of white mineral oil was then charged to the polymerization vessel during 0.17 hour. Diisopropylbenzene hydroperoxide solution (52.8% diisopropylbenzene hydroperoxide) was added in amounts of 0.212, 0.321, 0.321, 0.321, and 0.321 parts at 2.7, 4, 4.67, 5.33, and 6 hours respectively. A solution containing 25 weight percent diisobutylcresoxyethoxyethyl dimethyl benzyl ammonium chloride in butanol was added in amounts of 0.045, 0.07, 0.07, 0.07, and 0.07 part at 2.7, 4.67, 5.33, and 6 hours respectively. Additions of white mineral oil were made at 2.7 and 4 hours in amounts of 11.25 and 22.5 parts, respectively. Additions of 22.5 parts each of 100 SUS viscosity neutral oil were made at 4.67, 5.33, and 6 hours. At 6.5 hours, 840 parts of 100 neutral oil was finally charged and the batch was heated to 140° C. under reduced pressure and maintained at 135–141° C./2 mm. for 1 hour to give 1435 parts of an oil soultion containing 28.2% of graft copolymer. The viscosity of this oil solution at 210° F. was 819 centistokes. When oil blends were made and tested for dispersancy of asphaltenes, this graft copolymer exhibited excellent dispersancy at a graft copolymer concentration of 0.25% with 0.4% of asphaltenes. This is a marked improvement over a corrsponding copolymer made by the conventional procedure of mixing N-vinyl pyrrolidinone and the methacrylic esters, and then copolymerizing.

*Example 3*

There were mixed 525 parts of stearyl methacrylate, 452 parts of n-butyl methacrylate and 2.4 parts of a solution of 50% diisopropylbenzene hydroperoxide in alcohol. Thirty percent of this mixture and 0.48 part of a solution of 25% diisobutylphenoxyethoxyethyl benzyl dimethyl ammonium chloride in butanol were charged to a reaction vessel equipped with a stirrer, reflux condenser, inlet tube through which nitrogen gas flowed, and an oil bath. At the start the temperature was 105–125° C. and during the addition of the remaining 70% of the monomeric mixture, it was held between 115 and 120° C. At 4 hours it was allowed to fall to 104–105° C., at which level it was maintained until the end of 6.5 hours. At 2 hours, a sample (5.2 parts) was removed from the batch and the nonvolatile matter was determined by the procedure described in Example 1 and found to be 47.4% representing a copolymerization yield of 48.3%. At this time there was charged to the reaction vessel during 0.3 hour a mixture of 146.4 parts of stearyl methacrylate, 96 parts of N-vinyl pyrrolidinone, 0.24 part of a solution of 50% diisopropylbenzene hydroperoxide in alcohol, and 0.05 part of a solution of 25% diisobutylphenoxyethoxyethyl benzyl dimethyl ammonium chloride in butanol. An exothermic reaction caused the batch temperature to rise to 120° C. temporarily. Additions were made of initiator (50% solution of diisopropylbenzene hydroperoxide), promoter (25% solution of diisobutylphenoxyethoxyethyl benzyl dimethyl ammonium chloride in n-butanol), and white mineral oil and dilution oil (100 SUS viscosity neutral) as follows:

At 2.92 hours, 0.48 part catalyst, 0.1 part promoter, and 60 parts white mineral oil.

At 4 hours, 0.72 part catalyst, 0.14 part promoter, and 60 parts white mineral oil.

At 4.67 hours, 0.72 part catalyst, 0.14 part promoter, and 60 parts white mineral oil.

At 5.33 hours, 0.72 part catalyst, 0.14 part promoter, and 60 parts 100 SUS viscosity neutral oil.

At 6.0 hours, 0.72 part catalyst, 0.14 part promoter, and 60 parts 100 SUS viscosity neutral oil.

At 6.5 hours, 2538 parts additional neutral oil was charged and the batch was heated to 140° C. under reduced pressure and maintained at 135–140° C./2–3 mm. for 1 hour to give 4000 parts of product, a solution of 27% of graft copolymer in oil. Its viscosity at 210° F. was 1280 centistokes. The minimum weight percent copolymer to disperse 0.4 weight percent asphaltenes was 0.06% in comparison to 0.25% for a copolymer made by a polymerization process wherein the N-vinyl pyrrolidinone was initially mixed with the other polymerizable materials and the mixture was copolymerized.

*Example 4*

(a) An apparatus is used equipped with stirrer, thermometer, reflux condenser, inlet and outlet tubes for inert gas, and a device for admitting materials. It is swept with dry nitrogen. There are mixed 22.5 parts of white mineral oil, 56.8 parts of 95% pure n-butyl methacrylate, 172 parts of 99.4% pure lauryl myristyl methacrylate, and 135 parts of pure cetyl-stearyl methacrylate. There is then thoroughly mixed with the monomers 2.34 parts of a 50% diisopropylbenzene hydroperoxide solution in alcohol. A portion of 116 parts of this mixture is run into the apparatus where it is heated and stirred. A solution of 0.117 part of octyl phenoxyethoxyethylbenzyldimethylammonium chloride in 0.47 part of butanol is added. Heating is continued. At about 100° to 105° C. an exothermic reaction begins with the temperature of the mixture rapidly increasing to 124° C. The moment at which polymerization begins is taken as zero time. At 20 minutes' time the rest of the above mixture of monomeric esters is gradually run into the apparatus and polymerization is continued at 114°–116° C., addition being complete at about 100 minutes. A sample taken at this time and analyzed for polymer by the precipitation method shows a conversion of over 40%. At 110 minutes addition is started of 90 parts of a mixture made from 67.5 parts of lauryl myristyl methacrylate and 45 parts of N-vinyl pyrrolidinone, which mixture has been treated with a filter-aid and filtered to give a clear solution. The polymerizing mixture is then maintained within the range of 115°–120° C. At 160 minutes addition of more initiator and activator is begun and white mineral oil is added from time to time, the schedule being as follows: at 160 minutes, 0.234 part of the hydroperoxide, 0.0234 part of the quaternary ammonium chloride and 22.5 parts of oil; at 240 minutes 0.351, 0.04, and 22.5 parts of these respectively (the temperature being reduced over the next 40 minutes to 100° C. and held at this level until 360 minutes' time); at 280, 320, and 360 minutes each .234 part, 0.023, and 22.5 parts of the above materials respectively. At 390 minutes the temperature of the batch is raised gradually to 140° C. for a period of 30 minutes while the pressure is reduced to about 25 mm. Heating is discontinued, and a solvent naphtha is slowly added to a total of 602 parts. The resulting product contains 34.7% of graft copolymer and has a viscosity of 100 centistokes at 200° F. This solution in naphtha is especially useful for addition to kerosenes, fuel oils, diesel fuels, or jet fuels to disperse gums or sludges which may form therein.

(b) A reaction vessel was flushed with nitrogen and heated to 122°–130° C. by means of an oil bath. Monomeric mixture I was prepared by mixing 43.1 parts of stearyl methacrylate, 50 parts of styrene, 5 parts of white mineral oil, and 0.52 parts of a solution of 50 weight percent diisopropylbenzene hydroperoxide in alcohol.

A portion of 29.4 parts of this mixture was charged to the polymerization vessel with stirring, then 0.104 part of a butanol solution of 25 weight percent of diisobutylphenoxyethoxyethyl benzyl dimethyl ammonium chloride was also charged. Copolymerization occurred readily and 0.25 hour was allowed for the exothermal heat to subside. Thereupon the remaining 69.2 parts of monomeric mixture I was charged during 1.75 hours while a batch temperature was maintained of 117°–118° C. At 2 hours by analysis the copolymer yield was 48%. At this time addition of monomeric mixture II consisting of 8 parts of N-vinyl pyrrolidinone and 0.08 part of a solution of 50 weight percent diisopropylbenzene hydroperoxide in alcohol was begun and continued during 0.25 hour. After 4.18 hours the temperature of the vessel was allowed to fall so as to maintain a batch temperature of 104°–105° C. until a total of 6.75 hours had elapsed. Diisopropylbenzene hydroperoxide solution of 50% strength was added as follows: At 2.85 hours, 0.1 part; at 4.18 hours, 0.16 part; at 4.85 hours, 5 5 and 6.2 hours, 0.1 part, each respectively. For each charge of peroxide catalyst a corresponding charge of butanol solution of 25 weight percent of diisobutylphenoxyethoxyethyl benzyl dimethyl ammonium chloride was made; at 2.85 hours, 0.021 part; at 4.18 hours, 0.031 part; at 4.85, 5.5, and 6.2 hours each, 0.021 part respectively. Additions of 5 parts each of white mineral oil were made at 2.85 hours and 4.18 hours. Also, additions of 5 parts each of 100 SUS viscosity neutral oil were made at 4.85, 5.5, and 6.2 hours. At 6.75 hours, the batch was heated to 140° C./atmospheric pressure during 0.3 hour to destroy residual catalyst. Then, 131 parts of kerosene was charged during 0.17 hour. Agitation of the batch at 80°–110° C. was continued for about 1 hour to ensure homogeneity. The resulting solution containing 34.8% of graft copolymer weighed 258 parts. At 100° F. the viscosity was 1003 centistokes. The percent copolymer needed to disperse 0.4 weight percent of asphaltenes in lubricating oil was 0.25%. For a copolymer made by the conventional polymerization process at least 0.5% of such copolymer was needed. When 0.01 weight-volume percent of the copolymer of this invention was incorporated in a commercial fuel oil distillate and mixed with water at pH 4, as well as pH 7, the oil layer separated clear leaving only a trace of emulsion at the interface. This mixture disperses sludge which forms when it is blown with air at 400° F.

(c) The procedure given under (b) above was followed in making a copolymer from 51.3 parts of stearyl methacrylate, 42 parts of styrene, and 8 parts of N-vinyl-5-methyl pyrrolidone, again with the same quantities of hydroperoxide, promotor, oils, and kerosene as used above. The resulting oil-kerosene solution contained 34% of graft copolymer. At 100° F. its viscosity was 346 centistokes. An oil blend of 0.5% weight percent of copolymer dispersed 0.4% asphaltenes. This was a significant improvement over a value of 1.0% for a corresponding copolymer made by conventional methods.

(d) Yet another graft copolymer was prepared following the procedure given under (b) above using 51.3 parts of stearyl methacrylate, 30 parts of styrene, and 20 parts of N-vinyl-3,3,5-trimethylpyrrolidinone. Additions of hydroperoxide solution (50% diisopropylbenzene hydroperoxide) totaled 1.1 parts; of butanol solution of 25% diisobutylphenoxyethoxyethyl benzyl dimethyl ammonium chloride 0.299 part, of white mineral oil, 15 parts, of 100 SUS viscosity neutral oil 15 parts, and of kerosene 131 parts. The solution contained 34.1% of copolymer and at 100° F. its viscosity was 401 centistokes. When this graft copolymer was evaluated for dispersancy properties, it was markedly more effective than the corresponding copolymer of N-vinyl-3,3,5-trimethylpyrrolidinone made by the conventional polymerization process.

*Example 5*

(a) A reaction vessel was fitted with a reflux condenser, stirrer, inlet tube for nitrogen gas, and oil bath. The temperature of the reaction vessel was kept at 110°–123° C. the first 4 hours, thereafter for the duration of the copolymerization at 105° C. Over a period of 1.83 hours, there was charged thereto a mixture of 8.2 parts of vinyl stearate, 16.3 parts of vinyl 2-ethylhexoate, 10.1 parts of toluene, and 0.272 part of benzoyl peroxide. At 2 hours from the start, one half of the reaction mixture was removed for analysis. Weighed analytical samples were heated in a forced draft air oven for 4 hours at 150° C. These showed 49.1% nonvolatile matter, representing a 66.1% yield of polymer. At 100° F. the viscosity of the reaction mixture at this point was 9.8 centistokes.

To the other half of the reaction mixture at 114° C. there was added gradually a mixture of 1.36 parts of N-vinyl pyrrolidinone, 1.4 parts of toluene, and 0.007 part of benzoyl peroxide. Additions of benzoyl peroxide in toluene were subsequently made as follows: at 2.7 hours, 0.03 part in 1.4 parts of toluene; at 4 hours, 0.041 part in 1.4 parts of toluene; at 4.7 hours, 5.3 and 6 hours, 0.03 part each in 1.4 parts of toluene, respectively. At 6.5 hours, the batch was diluted with 11 parts of toluene. There resulted 33.9 parts of product which contained by analysis 30.7% of graft copolymer. At 100° F. its viscosity was 10.9 centistokes. A portion of the graft copolymer solution was mixed with a light lubricating oil and the mixture heated to drive off volatile matter. The resulting solution was stripped for an hour at 140° C./2 mm. to give a concentrate containing 45.5% of copolymer. One per cent of this graft copolymer readily and completely dispersed 0.4% asphaltenes in an oil blend. This result is a most significant improvement over a copolymer made by a conventional process which was prepared and tested as shown in the next part of this example.

A copolymer made by a conventional process of mixing the above monomers and polymerizing the mixture had no dispersing action at 2% in oil.

(b) A mixture of 18.75 parts of vinyl stearate, 6.25 parts of vinyl acetate, 5 parts of toluene, and 0.5 part of diisopropylbenzene hydroperoxide with 0.027 part of diisobutylphenoxyethoxyethyl benzyl dimethyl ammonium chloride was charged over 1.83 hours to a polymerization vessel heated at 110° C. At 1.83 hours the copolymer yield was 40.9% when determined by the nonvolatile method described in preceding sections. At this time 2.2 parts N-vinyl pyrrolidinone was added and the copolymerization continued for a total of 8.75 hours. In the same way as indicated above, additional catalyst, promoter, and solvent were charged during the course of the copolymerization and amounted to 0.55 part of a 54.9% diisopropylbenzene hydroperoxide solution, 1.21 parts of butanol solution of diisobutylphenoxyethoxyethyl benzyl dimethyl ammonium chloride of 25% strength, and 29 parts of toluene. The product was a clear, homogeneous toluene solution which amounted to 52.1 parts by weight. Analysis showed a content of 31.8% of graft copolymer. The viscosity of a toluene solution at 30% copolymer was 41.5 centistokes at 100° F.

A portion of 33.3 grams of the 31.8% copolymer solution was mixed with 10.6 grams of lubricating oil and stirred and heated under reduced pressure, finally at 140° C./1 mm. for 0.75 hour, to give 25.4 g. of a solution of 41.7% of copolymer. The minimum percentage of this graft copolymer to disperse 0.4% of asphaltenes in an oil blend was 0.125%. In comparison, a copolymer made by a normal polymerization process failed to disperse the same quantity of asphaltenes at 2% of such copolymer.

*Example 6*

(a) A reaction vessel was equipped with a semi-circular stirrer, condenser, thermometer, dropping funnel, electrically heated oil bath, and inlet tube through which nitrogen gas flowed throughout the polymerization cycle. To this vessel was charged 65.6 parts of dilauryl fumarate and 3.7 parts of a 50% diisopropylbenzene hydroperoxide solution, and 0.74 part of butanol solution of 25% diisobutylphenoxyethoxyethyl benzyl dimethyl ammonium chloride. The temperature was held at 111°–118° C. for 4.67 hours and then lowered to 105° C. for the remainder of the heating period which totaled 30 hours. Additions of the 50% diisopropylbenzene hydroperoxide solution were made as follows: at 2.67 hours, 0.74 part; at 4 hours, 1.11 parts; at 4.67, 5.33, and 6 hours, 0.74 part, respectively. At the same time, additions of the butanol solution containing 25% of diisobutylphenoxyethoxyethyl benzyl dimethyl ammonium chloride were made as follows: at 2.67 hours, 0.04 part; at 4 hours, 0.055 part; at 4.67 hours, 5.33 hours, and 6 hours each, 0.04 part, respectively. At 6 hours, 12.3 parts of reaction mixture was removed and treated with hydroquinone to prevent further polymerization and analyzed to show 83.2% solids representing a homopolymer yield of 85.2%. Also, at 6 hours, just previous to adding the catalyst and promoter, there was added a mixture composed of 10.0 parts of N-vinyl pyrrolidinone and 0.1 part of 50% diisopropylbenzene hydroperoxide solution. Heating and stirring were continued for an additional 24 hours, at which time 35 parts of toluene was charged. The solution of graft copolymer contained by analysis 55.7% solids representing a quantitative yield. A toluene solution adjusted to 30% copolymer gave a viscosity of 19.0 centistokes at 100° F.

The graft copolymer was transferred to a light lubricating oil by mixing oil and toluene solution and then heating under reduced pressure. The final stripping was done at 140° C./2.5 mm. An oil solution containing 59.9% copolymer was thus prepared. This concentrate is suitable for the facile addition of copolymer to various lubricating or synthetic oils. When oil blends were tested for dispersancy, only 0.125% of this graft copolymer was required to disperse 0.4% of asphaltenes. This is remarkable since a copolymer made by a conventional polymerization process was required to be present in concentration above 0.5% to disperse 0.4% of asphaltenes.

(b) Nine additional runs were made according to the procedure described above except that the time for the addition of the catalyzed N-vinyl pyrrolidinone was varied, that is, made at 1.83 hours, 4.0 hours, 8 hours, 10 hours, 12 hours, 14 hours, 16 hours, 20 hours, and 24 hours. Optimal dispersancy resulted when the catalyzed N-vinyl pyrrolidinone addition was made between about 4 hours and 16 hours when the homopolymer yield was 78% to 85%. The maximum viscosity of 52 centistokes at 100° F. for a toluene solution at 30% of graft copolymer was obtained when the N-vinyl pyrrolidinone was added at 8 hours.

*Example 7*

(a) A mixture was prepared from 34.4 parts of dilauryl fumarate, 12.5 parts of vinyl acetate, 12.5 parts of toluene and 5.0 parts of diisopropylbenzene hydroperoxide. Thirty percent of this mixture was placed in a reaction vessel which was swept out with nitrogen, stirred and heated to 105° C., whereupon 1 part of a butanol solution of 25% di-dodecenyl dimethyl ammonium chloride was charged. In about 5 minutes copolymerization began and the rest of the mixture was added thereto in small increments over the course of 1.83 hours. At this point, a mixture of 4 parts of N-vinyl pyrrolidinone and 0.04 part of diisopropylbenzene hydroperoxide solution of 50% strength was added. The batch temperature was kept at 110°–115° C. for the first 4 hours and thereafter at 105° C. Additional hydroperoxide (50% solution), quaternary ammonium chloride (25% solution), and toluene were added as follows: at 2.67 hours, 1 part hydroperoxide solution, 0.2 part di-dodecenyl ammonium chloride solution with 2.5 parts toluene; at 4 hours, 1.5 parts hydroperoxide solution, 0.3 part di-dodecenyl dimethyl ammonium chloride solution; at 4.67, 5.33, and 6 hours, 1 part hydroperoxide solution, 0.2 part di-dodecencyl dimethyl ammonium chloride solution with 2.5 parts toluene, respectively. At 6.5 hours, the batch was diluted with 6 parts toluene. A solution of 46.9% copolymer was the product. A toluene solution adjust to 30% of copolymer gave a viscosity of 8.7 centistokes at 100° F.

The graft copolymer was transferred to a light neutral oil by mixing the above product and oil and taking off the solvent by heating the mixture under reduced pressure to 140° C./3 mm. The oil solution thus prepared contained 56% of copolymer. This solution was useful for supplying the copolymer to lubricating oils or synthetic lubricants.

When this graft copolymer was used in blends to ascertain its effectiveness as a dispersant, it was found that only 0.25% copolymer was needed to disperse 0.4% of asphaltenes. This is a significant improvement over a corresponding copolymer made by conventional polymerization process. The use of vinyl acetate in forming the copolymer was found to enhance the dispersing properties of the copolymer for this particular N-vinyl pyrrolidinone contents.

(b) A mixture was prepared from 34.4 parts of dilauryl fumarate, 12.5 parts of vinyl acetate, 12.5 parts of toluene, and 1.25 parts of benzoyl peroxide. It was placed in a reaction vessel swept with nitrogen gas, agitated, and heated at a temperature of 103°–107° C. At 0.34 hour 12.5 parts of additional toluene was charged. The addition for this mixture totaled 1.83 hours. The reaction mixture was sampled and weighed analytical samples were heated in the presence of hydroquinone in a vacuum oven (120° C./2 mm.) for 4 hours. The nonvolatile matter indicated a 66% copolymer yield. At 1.9 hours 4 parts of N-vinyl pyrrolidinone catalyzed with 0.025 part of benzoyl peroxide was added. The reaction vessel was maintained at 110° C. for the duration of the copolymerization cycle. At 2.67 hours, 0.25 part of benzoyl peroxide dissolved in 2.5 parts of toluene was added. At 4, 4.67, 5.3, and 6 hours, 0.38 part of benzoyl peroxide each in 2.5 parts of toluene was added respectively. At 6.5 hours, 6 parts toluene was added and the entire batch heated to 115° C. for 10 minutes. The product was allowed to cool and weighed 86 parts, containing by analysis 52.8% of copolymer. The copolymer was transferred to a light mineral oil by stripping 80 parts of the toluene solution in 25 parts of light mineral oil for 2.3 hours at 30° to 150° C./3 mm. to give a viscous concentrate of 56% graft copolymer which was brown in color.

Blends were prepared for determination of dispersing action and it was found that only 0.5% of the graft copolymer was required to effectively disperse 0.4% asphaltenes. A corresponding copolymer made by solution polymerization in the conventional manner, wherein all the N-vinyl pyrrolidinone was present in the monomeric mixture from the very beginning, was obtained in essentially the same yield (90.3% versus 90.6%) but when tested for effectiveness as a dispersant, it was found that even at 2% this copolymer failed to disperse 0.4% asphaltenes.

(c) A diester was made by esterifying one mole of fumaric acid with two moles of a commerical mixture composed of 4% of n-decanol, 66.4% of n-dodecanol, 27.2% of n-tetradecanol, and 2.4% of hexadecanol. A mixture was prepared by mixing 34.4 parts of this dilaurylmyristyl fumarate with 13.2 parts of methyl acrylate, 12.5 parts of toluene, and 1.25 parts of benzoyl peroxide. This mixture was charged with stirring under a nitrogen atmosphere during 1.83 hours to a reaction vessel. The reaction vessel was heated in an oil bath to 114°–125° C. during the first 4 hours, and for the next three hours at 110° C. for a total of 7 hours. At 1.83 hours, an aliquot was taken and on analysis by the method described in Example 1, a solids value of 41.4% was obtained, represented a copolymer yield of 53.3% at this stage in the polymerization cycle. After the sample had been withdrawn, a mixture of 4 parts of N-vinyl pyrrolidinone and 0.2 part benzoyl peroxide was charged. In accordance with the procedure above 1.375 parts of additional benzoyl peroxide and 25 parts of additional toluene were added in small portions during the course of the copolymerization. The product was 57.2% solution of graft copolymer corresponding to a 92.5% yield based on the monomers. A portion of the product, adjusted to 30% copolymer in toluene, had a viscosity of 13.2 centistokes at 100° F.

A portion of 70.5 parts of the product was mixed with 24.8 parts of 100 SUS viscosity neutral oil. The mixture was heated at 140° C. under reduced pressures down to 3 mm. where it was held for one hour to give 67.8 parts of a solution of 59.6% of copolymer in oil. Its viscosity at 210° F. was 192 centistokes. Only 0.25% of this graft copolymer was needed the disperse 0.4% asphaltenes. Two percent of a copolymer made by the conventional copolymerization process failed to disperse the same quantity of asphaltenes in a similar oil blend.

*Example 8*

(a) A mixture of 24 parts of distearyl maleate, 10.1 parts of toluene, and 1.5 parts of 50% diisopropylbenzene hydroperoxide solution was treated with 0.075 part of diisobutylphenoxy-ethoxyethyl benzyl dimethyl ammonium chloride dissolved in 0.225 part of n-butanol. The mixture wah heated at 114°–115° C. under a nitrogen atmosphere. At 2 hours from the start an aliquot was removed and when analyzed by the procedure given in Example 1, showed 26.8% solids, indicating a 40% homopolymer yield at this point. Immediately after this sampling there was charged a solution of 6 parts of N-vinyl pyrrolidinone and 0.6 part of 50% diisopropylbenzene hydroperoxide solution, and 0.12 part of a butanol solution of 25% diisobutylphenoxyethoxyethyl benzyl dimethyl ammonium chloride. Additions of small portions of initiator, the 50% solution of diisopropyl-benzene hydroperoxide, of promoter, the 25% solution of diisobutylphenoxyethoxyethyl benzyl dimethyl ammonium chloride in butanol and of toluene were made at 2.67, 4, 4.67, 5.33, and 6 hours and totaled 1.65 parts, 0.33 part, and 4.4 parts, respectively. Heating was discontinued at 24 hours, toluene in an amount of 10.4 parts was added, and stirring was continued until the product had cooled below 40° C. The product was a solution of 66.7% of graft copolymer in toluene. A 30% solution of the copolymer had a viscosity of 49.6 centistokes at 100° F.

A mixture of 32 parts of the 66.7% solution and 15.6 parts of light lubricating oil was heated to 140° C./2.5 mm. to yield a 55.4% solution of copolymer in oil. This oil solution showed a viscosity of 753 centistokes at 210° F. The presence of 0.125% graft copolymer effectively dispersed 2% asphaltenes in a test blend.

(b) A graft copolymer was made according to the procedure above except that the proportion of N-vinyl pyrrolidinone was increased to 30–3 weight percent. It had the same degree of dispersancy as the previous copolymer. However, an oil solution of 55.8% of this copolymer gave a much higher viscosity, 3203 centistokes at 210° F. This graft copolymer, as was the preceding one, was over twice as effective as corresponding copolymers made by the conventional polymerization process when tested for dispersancy of asphaltenes in oil.

*Example 9*

(a) A mixture of 24 parts of distearyl itaconate, 7.5 parts of toluene, 1.07 parts of a cumene hydroperoxide having 70% active ingredient, and 0.3 part of butanol solution of diisobutylphenoxyethoxyethyl benzyl dimethyl ammonium chloride at 25% concentration was heated under nitrogen in a reaction vessel maintained at 120°–124° C. At two hours from the start, an aliquot of reaction mixture was found to contain 50.2% of copolymer representing a 68% homopolymer yield. The method for determination of polymer content described in Example 1 was here used. After the sampling had been done, there was charged 6 parts of N-vinyl pyrrolidinone mixed with 0.04 part of cumene hydroperoxide of 70% strength and then 0.01 part of butanol solution of 25% of diisobutylphenoxyethoxyethyl benzyl dimethyl ammonium chloride. The reaction vessel was heated at 120°–124° C. for the first 4 hours and thereafter at 114° C. for a total of 25 hours. Additions of 70% cumene hydroperoxide or solution were made as follows: at 2.67 hours, 0.21 part; at 4 hours, 0.32 part; and at 4.67, 5.3, and 6 hours each, 0.21 part respectively. Also, immediately following each addition of the cumene hydroperoxide, additions of solution of 25% diisobutylphenoxyethoxyethyl benzyl dimethyl ammonium chloride in butanol were made as follows: at 2.67 hours, 0.06 part; at 4 hours, 0.09 part; and at 4.67, 5.3, and 6 hours each, 0.06 part respectively. One part of toluene was also charged with each addition of promoter. At 24 hours 17.4 parts of toluene was charged and the batch was allowed to cool to 40° C. The product was a solution of 49.1% graft copolymer in toluene. A toluene solution at 30% copolymer gave a viscosity of 10.1 centistokes at 100° F.

A mixture of 47.5 parts of the 49.1% solution and 15 parts of 100 SUS viscosity neutral oil was heated to 140° C./2.5 mm. to yield 41.5 parts of stripped oil solution of 56.3% copolymer. Its viscosity was 125 centistokes at 210° F. Presence of 0.25% of this graft copolymer effectively dispersed 0.4% asphaltenes in a test blend. This is a marked improvement over a copolymer made by the conventional polymerization process, which required more than 2% of such copolymer to disperse asphaltenes.

(b) By the procedure described in Example 7, part (b) there was polymerized a mixture of 34 parts of dilauryl itaconate, 12.5 parts of vinyl acetate, 12.5 parts of toluene and 1.25 parts of benzoyl peroxide. The aliquot sampled at 1.83 hours showed 54.2% of copolymer on analysis by the precipitation method given in Example 1. This value represented a 69.7% yield of polymer. To this polymer and unreacted monomer was added a solution composed of 4 parts of N-vinyl pyrrolidinone, 0.02 part of benzoyl peroxide, and 8.7 parts of toluene, and heating was continued at 105° C. for a total of 24 hours.

Additions of benzoyl peroxide and toluene from time to time totaled 1.38 parts and 27.8 parts, respectively. The product obtained was a solution of 48.3% of graft copolymer in toluene. At 30% of copolymer in toluene the viscosity was 56.6 centistokes at 100° F.

A portion of the toluene solution was mixed with 24.6 parts of mineral oil and heated to drive off the toluene. This oil solution was heated to 140° C./2.5 mm. The stripped oil solution contained 46.8% of copolymer. Its viscosity was 1193 centistokes at 210° F. The presence of 0.5% of graft copolymer dispersed 0.4% of asphaltenes in a test blend. For comparison, 1% of a copolymer produced by the conventional polymerization process gave only a deposition of sludge.

*Example 10*

(a) Di-cetyl-stearyl fumarate was prepared from a mixture consisting of 4% myristyl alcohol, 34% cetyl alcohol, and 62% stearyl alcohol using direct esterification with p-toluene sulfonic acid as the catalyst. The di-ester was obtained in 94% yield.

A mixture of 50 parts of the di-cetyl-stearate fumarate, 10 parts vinyl acetate, 15 parts toluene, and 2 parts benzoyl peroxide were charged to a reaction vessel heated at 125° C. and flushed with nitrogen over a period of 2 hours. At 2.75 hours, 0.4 part benzoyl peroxide dissolved in 5 parts of toluene was added. The temperature was held at 125° C. for 4 hours; it was then maintained at 112° C. for an additional 20 hours. At 4 hours, one-half of the batch was withdrawn and analyzed.

During the interval, 4 to 4.17 hours, a mixture composed of 20 parts of N-vinylcaprolactam, 0.1 part benzoyl peroxide and one part of toluene was added to the remaining charged materials. A portion of 0.2 part of benzoyl peroxide in 1 part of toluene was added at 4.67 hours. At 6 hours, 5.9 parts of reaction mixture was removed and analyzed to show a 58% of copolymer yield at this stage of the copolymerization. At 6.17 hours, 0.2 part benzoyl peroxide in 1 part of toluene was again charged. At 23 hours, 50 parts of toluene was added and at 24 hours, heating was discontinued. The product was obtained as a toluene solution, 25.8% of graft copolymer.

A portion of the graft copolymer was transferred to a light lubricating oil. The concentrate was then used in making a blend for the dispersion test. It was found that 1% of this copolymer effectively dispersed 0.4% asphaltenes.

Another copolymer, made by the conventional polymerization process, failed to disperse the 0.4% asphaltenes at 1% of copolymer concentration.

(b) There are mixed 95.2 parts of a 98.5% pure lauryl-myristyl methacrylate, 5 parts of toluene, and 0.25 part of a 50% diisopropylbenzene hydroperoxide solution in alcohol. About one fourth of this mixture is charged to a polymerization apparatus and thereto is added a solution of 0.0125 part of isooctylphenoxyethyl benzyl dimethyl ammonium chloride in 0.05 part of butanol. The resulting mixture is stirred and heated. At about 108° C., polymerization occurs with a rise in temperature. This point is taken as zero time. In about 20 minutes, a maximum temperature of 126° C. occurs and the rest of the monomeric mixture is slowly run into the apparatus with the temperature at 116° C. to 119° C. A sample of the polymerizing mixture taken at this point shows polymerization of about 45%. At 100 minutes, there is added over a 15-minute period a mixture of 6.25 parts of N-vinylcaprolactam and 0.1 part of a 50% diisopropylbenzene hydroperoxide solution in alcohol. Additions are made of dissopropylbenzene hydroperoxide, quaternary ammonium salt, and toluene respectively at intervals, as follows: at 150 minutes, 0.025 part, 0.0025 part, and 5 parts; at 280 minutes, 0.025 part, 0.0025 part, and 5 parts; at 320 minutes, 0.025 part, 0.0025 part, and 5 parts; and at 360 minutes, 0.025 part, 0.0025 part, and 10 parts. At 390 minutes, there is added a portion of 125 parts of toluene. After 240 minutes, the temperature is allowed to fall to 105° C., at which level it is maintained until 410 minutes.

The product is a solution of 31.8% of graft copolymer. When adjusted with toluene to a 30% copolymer content, the solution then has a viscosity of 287.9 centistokes at 100° F. This solution can be added directly to fuel oils to provide excellent stabilization with freedom from separation of gum or sludge.

The graft copolymer may readily be transferred to a lubricating oil by mixing the above toluene solution with a selected grade of oil and heating the mixture to distill off volatile material. For example, 71.1 parts of the solution of 31.8% of copolymer is mixed with 52.8 parts of a 100 neutral oil. The mixture is stirred and heated under reduced pressure. It is held at 142° C. at 20 mm. for 15 minutes and at 1–2 mm. for 60 minutes to give a solution of 29.4% of graft copolymer in oil.

When portions of this concentrate of polymer are added to lubricating oil to provide solutions at 2% down to 0.125% of copolymer, these blends are treated with a standard asphaltene solution, and the mixture is heated at 150° C., all of these blends exhibit dispersing activity.

A copolymer prepared by mixing all of the above comonomers in the same proportions and heating the mixture with the same amounts of initiator and activator fails to show any dispersing activity.

Another copolymer made by first mixing 90 parts of lauryl myristyl methacrylate and 110 parts of N-vinylcaprolactam and then copolymerizing the mixture likewise fails to exhibit any dispersing action.

(c) The process described in detail above is carried out with 83.5 parts of pure lauryl-myristyl methacrylate which is polymerized to an extent of about 50% and then 17.5 parts of N-vinylcaprolactam is supplied. The schedule is essentially as given above.

The product is a 33% solution of graft copolymer in toluene. At 30% copolymer concentration the viscosity of the solution is 333 cs. at 100° F. This solution when added to kerosene to give a copolymer concentration of 0.002% disperses any sludge which is formed in any accelerated oxidation test over five hours at 400° F.

The graft copolymer is transferred by the step shown above to a 100 neutral lubricating oil and volatile materials are then stripped off. This oil solution containing 28.1% of the copolymer has a viscosity of 611 centistokes at 100° F. Dispersing activity is excellent as judged from the dispersion of asphaltenes even at a concentration of 0.125% of copolymer.

Engine tests with this graft copolymer also establish its effectiveness in maintaining cleanliness. A base oil having engine scores of 6.7 for the varnish rating and 55.4 for sludge, total 62.1, improved with 1.4% of the above polymer to give scores of 11.2 for varnish, 62.6 for sludge, and 73.8 total.

Example 11

The schedule of times and temperatures used in the previous examples (10a) is followed with a copolymer based on 90 parts of lauryl-myristyl methacrylate and 10 parts of N-vinyl piperidone. In the first stage the methacrylic ester is polymerized in toluene to an extent of about 60%, whereupon the N-vinyl piperidone is slowly added and polymerization is carried on for 420 minutes. Additions of initiator, activator, and solvent are made in nearly the same way.

The product is a 42% solution of graft copolymer. When the solution is adjusted with toluene to a 30% copolymer content, the solution has a viscosity of 289 centistokes at 100° F. This copolymer is highly effective as a dispersing agent for asphaltenes. It is active in dispersing gums in fuel oils. It is efficient as a low temperature dispersing agent in lubricating oils.

In contrast a copolymer made by mixing the same proportions of lauryl-myristyl methacrylate and N-vinyl piperidone and copolymerizing the mixtures fails to exhibit dispersing action.

Example 12

(a) To a polymerization vessel swept with nitrogen and heated with an oil bath at 105° C., there was charged a portion of 10 parts of a mixture of 25.1 parts of 95.8% pure lauryl-myristyl methacrylate, 7.5 parts of toluene, and 0.075 part of a 50% diisopropylbenzene hydroperoxide solution. The mixture was stirred and 0.015 part of a butanol solution containing 25% of diisobutyl-phenoxyethoxyethyl benzyl dimethyl ammonium chloride was added. The time of this last addition was taken as zero time. The polymerization reaction began at this time with evolution of heat which carried the temperature of the mixture to about 120° C., at which point cooling was applied. Thereafter the temperature was held at 110°–115° C. After 20 minutes there was begun the gradual addition of the rest of the above mixture, extending over a period of 100 minutes. At 120 minutes from the start a sample was taken and the extent of polymerization determined by precipitation of polymer as 56%. Addition was then made of 6.12 parts of N-vinyloxazolidone, which may be prepared according to the method of Jour. Org. Chem. 22, 849. From time to time additional amounts of the hydroperoxide initiator and quaternary ammonium initiator were made for a total of 0.075 part of the 50% diisopropylbenzene hydroperoxide solution and 0.015 part of the 25% solution of the above-named quaternary ammonium salt, these additions being complete at 420 minutes. At 450 minutes additional toluene was added and the temperature was allowed to fall. The product was a 40.7% solution of graft copolymer. A sample of this adjusted with toluene to 30% copolymer had a viscosity of 157.5 centistokes at 100° F.

Blends of this graft copolymer were made with a 100 neutral oil with concentrations of 2%, 1%, 0.5%, and 0.25% of copolymer. These were tested for dispersing action against 0.4% of asphaltenes in the usual way. All blends dispersed the asphaltenes.

The data demonstrate that between 5% and 35% of N-vinyl oxazolidone provides dispersing action when the catalyzed delayed method of this invention is followed. Similar limits also hold for methacryloxyethyloxazolidone, acryloxyethyloxazolidone, or methacrylamidoethyloxazolidone additions in the preparation of copolymers. The preferred proportions for any of these oxazolidone derivatives in copolymers is from 15% to 30% by weight.

Example 13

(a) The procedure of Example 12 was followed with a mixture of 92 parts of lauryl-myristyl methacrylate and 2 parts of dimethylaminoethyl methacrylate as the initial charge, 0.5 part of diisopropylbenzene hydroperoxide being used at the start and 0.55 part of this initiator being supplied as copolymerization proceeded. After initial polymerization of the charge there were gradually added six parts of N-vinyloxazolidone as above. The product was a solution of the copolymer of the various comonomers in toluene.

This graft copolymer was tested for dispersing action of asphaltenes in oil and found to be effective even at 0.125%.

(b) The procedure of Example 12 was followed. The first charge comprised a mixture of 90 parts of lauryl-myristyl methacrylate and 5 parts of N-tert-butylaminoethyl methacrylate in toluene. After this was carried to about 60% polymerization, addition was gradually made of 5 parts of N-vinyloxazolidone. The product was a toluene solution of graft copolymer. It was also very effective as a dispersing agent. Even at 0.125% of copolymer it dispersed 0.4% of asphaltenes in a blend of copolymer and 100 neutral oil.

Example 14

A mixture was prepared from 45 parts of lauryl methacrylate, 2.5 parts of toluene, and 0.125 part of diisopropylbenzene hydroperoxide solution of 50% strength. A portion of 12.1 parts of this mixture was run into a reaction vessel heated at 122° C. and flushed with nitrogen. Thereto was added 0.025 part of butanol solution of 25% diisobutylphenoxyethoxyethyl benzyl dimethyl ammonium chloride to activate the polymerization, and as soon as the exothermic reaction had subsided (8 minutes), the rest of the mixture was charged over a total of 1.7 hours. At 1.7 hours, an aliquot was removed and analyzed for percentage homopolymer by the method given in Example 1. The copolymer yield was 64%. Thereupon, another mixture consisting of 5 parts of N-vinyl succinimide, 5 parts of toluene, and 0.05 part of 50% of diisopropylbenzene hydroperoxide solution was added to the reaction vessel dropwise during 0.25 hour. A slight rise in temperature was recorded. Heating at 123°–124° C. was continued until 4.25 hours, at which time the temperature was lowered to 112° C. for the rest of the polymerization cycle. Additions of 50% of diisopropylbenzene hydroperoxide solution were made of 0.03, 0.04, 0.03, 0.03, and 0.03 parts at 2.75, 4.25, 4.92, 5.59, and 6.26 hours respectively. For each part of 100% diisopropylbenzene hydroperoxide, there was also added each time, one-tenth as much promoter, diisobutylphenoxyethoxyethyl benzyl dimethyl ammonium chloride as a butanol solution of 25% concentration. Also at each addition period, there was charged 2.5 parts of toluene. After 6.68 hours, addition was made of 60 parts of toluene. At 6.8 hours, the batch was allowed to cool at 30° C. The product was 130.6 parts of toluene solution of copolymer. Analysis by evaporation at 150° C. in a forced draft oven showed a nonvolatile content of 34.7%, representing a copolymer yield of 90.6%. A toluene solution adjusted to 30% of graft copolymer content, gave a viscosity of 224.6 centistokes at 100° F.

A mixture of 59.7 parts of the 34.7% solution and 48.4 parts of light lubricating oil was stirred and heated under reduced pressure to 140° C./1–2 mm. to give 70.7 parts of cloudy solution containing 29.3% of graft copolymer.

A test blend of oil and 0.25% of graft copolymer gave a trace of sediment, whereas 0.5% copolymer gave complete dispersancy of 0.4% asphaltenes. A like copolymer made by the conventional polymerization process failed to disperse the asphaltenes even at 2% concentration of such copolymer, even though it was in the same molecular weight range.

Example 15

The general procedure given in the above example was followed with a mixture prepared from 10.7 parts of lauryl methacrylate, 0.6 part of toluene, and 0.24 part of 6.5% solution of diisopropylbenzene hydroperoxide. The 6.5% solution of diisopropylbenzene hydroperoxide was made by mixing 10 parts of the commercially available 50% solution with 67 parts of n-butanol. A portion of 2.9 parts of this mixture was charged to the reaction vessel together with 0.1 part of a butanol solution containing 1.5% of diisobutylphenoxyethoxyethyl benzyl dimethyl ammonium chloride. As soon as polymerization had started, the rest of the mixture was fed into the reaction vessel for a total of 1.7 hours. Previous experience had shown that the homopolymer yield at this stage in the polymerization process was about 60%. Hence, there was added dropwise during 7 minutes a mixture of 1.85 parts of N-(8-methacryloxy-3,6-dioxaoctyl) pyrrolidinone, $n_D^{20}$ 1.4804) and 0.14 part of a 6.5% solution of diisopropylbenzene hydroperoxide.

As soon as this mixture had been added to the reaction vessel, 10 parts of toluene was charged. Heating at 123°–124° C. was continued until 4 hours, at which time the temperature was lowered to 113° C. for the rest of the polymerization cycle. Additions of diisopropylbenzene hydroperoxide, 6.5% solution, were made as follows: at 3 hours, 0.05 part; at 4 hours, 0.07 part, and at 4.67, 5.5, and 6 hours, 0.05 part each respectively. Diisobutylphenoxyethoxyethyl benzyl dimethyl ammonium chloride, 1.5% in butanol, was also added as follows: at 3 hours, 0.02 part; at 4 hours, 0.03 part, and at 4.67, 5.5 and 6 hours, 0.021 part respectively. A total of 50 parts of toluene was charged in portions between 3 and 6.4 hours. At 6.4 hours heating was stopped and the batch was allowed to cool. The product was obtained as a toluene solution of 21.7% solids, as determined by evaporating volatile matter from a weighed sample in an aluminum pan for 4 hours at 150° C.

A portion of 33.5 parts of the 21.7% solution was mixed with 16.9 parts of light lubricating oil and stirred and heated under reduced pressure to 140° C./3 mm. to give 25.6 parts of oil solution containing 28.4% of copolymer.

A test blend was prepared with 1% of this graft copolymer. It dispersed 0.4% of asphaltenes. This is a marked improvement over a copolymer made by the conventional polymerization process, more than 2% of copolymer being then required to disperse the same amount of asphaltenes.

Example 16

In a similar manner a mixture of 22.3 parts of lauryl methacrylate, 2.5 parts of toluene, and 0.063 part of 50% solution of diisopropylbenzene hydroperoxide was fed to a reaction vessel swept with nitrogen and heated at 123°–124° C. to which 0.21 part of a butanol solution of 1.5% of diisobutylphenoxyethoxyethyl benzyl dimethyl ammonium chloride was added as activator. At 1.7 hours, a catalyzed delayed addition was made dropwise during 7 minutes of a mixture of 2.7 parts of N-(3-methacryloxypropyl)pyrrolidinone and 0.01 part of 50% solution of diisobutylphenoxyethoxyethyl benzyl dimethyl ammonium chloride.

At 4 hours, the temperature of the vessel was allowed to fall to 115° C., at which level it was maintained until a total of 7 hours had elapsed. Portions of a 6.5% diisopropylbenzene hydroperoxide solution, of a 1.5% diisobutylphenoxyethoxyethyl benzyl dimethyl ammonium chloride solution in n-butanol, and of toluene were charged during the course of the copolymerization and totaled 0.54 part, 0.22 part, and 37.5 parts, respectively. The product was obtained as a toluene solution of 21.8% of graft copolymer. The percentage of copolymer was determined by the evaporation method described in Example 6.

Sixty-four parts of the 21.8% solution were mixed with 32.5 parts of 100 SUS viscosity neutral oil and heated and stirred under reduced pressure to 140° C./2 mm. to give an oil solution of 27.6% of graft copolymer. Only 0.25% of this graft copolymer was required in a test blend to disperse 0.4% asphaltenes.

Another experiment was run wherein all the N-(methacryloxypropyl)-pyrrolidinone was charged in the original monomeric mixture. The same quantities of materials were used throughout this run as given above. The resulting copolymer was obtained in 79.6% yield. However, 0.5% of this copolymer was required to effectively disperse 0.4% asphaltenes.

Example 17

(a) A mixture was prepared from 14.2 parts of vinyl stearate, 6.88 parts of vinyl 2-ethylhexoate, 1.25 parts of toluene, and 1.0 part of 50% solution of diisopropylbenzene hydroperoxide. A portion of 4.6 parts of this mixture and 0.2 part of butanol solution of 25% of diisobutylphenoxyethoxyethyl benzyl dimethyl ammonium chloride were charged to a reaction vessel kept at 118° to 122° C. After 0.3 hour the rest of the mixture was charged over 1.53 hours. The batch was stirred and blanketed with nitrogen gas. At 1.83 hours, an 0.3 g. sample was removed and by the evaporation method the residue left indicated at 57% yield of copolymer at this stage. During the time interval between 1.83 and 2 hours, a mixture composed of 3.92 parts of 1-(2-methacrylamidoethyl)-3,3,5-trimethyl pyrrolidinone, 5 parts of toluene, and 0.1 part of 50% solution of diisopropylbenzene hydroperoxide was added along with 0.02 part of butanol solution of 25% of diisobutylphenoxyethoxyethyl benzyl dimethyl ammonium chloride. Until the end of 4.7 hours the temperature was held at 111°–118° C. It was then held at 107° C. for the next two hours. Diisopropylbenzene hydroperoxide in 50% solution and diisobutylphenoxyethoxyethyl benzyl dimethyl ammonium chloride in 25% butanol solution, and toluene were added from time to time and amounted to 1.4, 0.28, and 5 parts respectively. At 6.5 hours 14 parts of toluene was added and the batch allowed to cool. The product was a clear, red-amber toluene solution which amounted to 48.5 parts. The viscosity of a 30% toluene solution was 16.2 centistokes at 100° F.

The graft copolymer was transferred to a light petroleum oil by heating the toluene solution with the oil under reduced pressure with final heating at 139° C./2.5 mm. A 26.6% concentrate was thus prepared.

A concentration of 0.25% of this graft copolymer effectively dispersed 0.4% asphaltenes in the test blend. This is a marked improvement over the performance of a copolymer made by the conventional copolymerization process given in the next part (b).

Example 18

By the general procedure given in Example 14, there was polymerized 90 parts of lauryl methacrylate in 5 parts of toluene, there being used 0.25 part of 50% solution of diisopropylbenzene hydroperoxide activated with 0.05 part of 25% solution of diisobutylphenoxyethoxyethyl benzyl dimethyl ammonium chloride. Analysis of a sample taken at 1.7 hours by the evaporation method showed a nonvolatile content of 64.4%, representing a 68% polymer yield. The catalyzed delayed addition was made at 1.7 hours of a mixture of 10 parts of dimethylacrylamide and 0.1 part of a 50% diisopropylbenzene hydroperoxide solution. Additional hydroperoxide solution of 50% strength was added in small portions during the course of the copolymerization and totaled 0.275 part, while additional promoter solution, 25% diisobutylphenoxyethoxyethyl benzyl dimethyl ammonium chloride, totaled 0.055 part. Portions of toluene added during the course of the copolymerization amounted to 135 parts. The heating was stopped at 6.8 hours. The product was 233.3 parts of a toluene solution which contained 37.1% of graft copolymer, representing an 86.6% graft copolymer yield. A toluene solution of 30% of graft copolymer had a viscosity of 196.1 centistokes at 100° F.

As in the preceding examples, a portion of the toluene solution of graft copolymer was mixed with a light lubricating oil and stripped to provide an oil solution of 29.5% of copolymer. A concentration of 0.25% of copolymer dispersed 0.4% asphaltenes in a test blend. This is remarkable in view of the fact that a similar copolymer, made by the conventional method of copolymerizing dimethylacrylamide with lauryl methacrylate in a mixture did not disperse 0.4% asphaltenes, even at a copolymer concentration of 2%.

*Example 19*

The procedure in Example 18 was used to polymerize 90 parts of lauryl methacrylate to the extent of 64%. Then, at 1.7 hours a catalyzed delayed addition of 10 parts of N-n-butyl acrylamide mixed with 0.1 part of diisopropylbenzene hydroperoxide in 50% solution was made and copolymerization effected. The quantities of initiator, promoter, and solvent added during the course of the copolymerization were the same as in Example 18. The product was obtained as a toluene solution which contained by analysis 41.0% of graft copolymer. A portion of the product diluted to 30% of graft copolymer, with additional toluene, gave a viscosity of 173.7 centistokes at 100° F.

A mixture of 123.1 parts of the 41% solution and 112.2 parts of lubricating oil was heated and stirred under reduced pressure, finally at 138° C./3 mm. to give an oil solution of 29.9% of graft copolymer.

A number of similar copolymers was made by the conventional method of copolymerization of a mixture of comonomers. These gave dispersancy tests definitely inferior to the above copolymer. This graft copolymer effectively dispersed 0.4% asphaltenes in an oil blend when the copolymer concentration was 1%. Two to five times as much conventional copolymer was required to demonstrate dispersing activity.

*Example 20*

The procedures already discussed in detail for the delayed addition of the catalyzed nitrogen-containing monomer were followed, thereby mixing 90 parts of lauryl methacrylate, 5 parts of toluene, and 0.25 part of diisopropylbenzene hydroperoxide in 50% solution. After addition of 0.05 part of butanol containing 0.013 part of diisobutylphenoxyethoxyethyl benzyl dimethyl ammonium chloride, polymerization of the lauryl methacrylate was carried out to a polymer conversion of 61% after two hours. Thereupon a mixture of 10 parts of dimethylaminopropyl methacrylamide with 0.1 part of 50% solution of diisopropylbenzene hydroperoxide was added during 10 minutes. The reaction vessel was heated at 123° C. the first 4 hours and thereafter at 113° C. for a total of 6.75 hours. Portions of 50% solution of diisopropylbenzene hydroperoxide, 25% solution of diisobutylphenoxyethoxyethyl benzyl ammonium chloride, and toluene were added during the course of the polymerization cycle. These totaled 0.275 part, 0.045 part, and 25 parts respectively. After 6.5 hours of heating the batch was taken up in 100 parts of toluene. Yield of graft copolymer was determined as 82.3%.

A portion of 121 parts of this toluene solution containing 37.7% of a graft copolymer was mixed with 99.3 parts of light mineral oil. The mixture was stirred and heated under reduced pressure to 138° C./3 mm. to give an oil solution of 29.8% copolymer.

An oil blend containing 0.5% of graft copolymer dispersed 0.4% asphaltenes effectively. A copolymer made by the conventional polymerization process dispersed 0.4% of asphaltenes at 1% copolymer concentration.

*Example 21*

(a) A mixture was prepared from 252 parts of stearyl methacrylate, 294 parts of lauryl methacrylate, 281.4 parts of butyl methacrylate, and 1.15 parts of 54.9% solution of diisopropylbenzene hydroperoxide. Two and one-half parts of white mineral oil, 262.6 parts of this mixture, and 0.21 part of butanol solution containing 0.052 part of diisobutylphenoxyethoxyethyl benzyl dimethyl ammonium chloride were charged to a reaction vessel which was swept with nitrogen and which was maintained with stirring at 120° C. During 15 minutes an exotherm occurred whereupon the batch temperature rose to 130° C. and some cooling became necessary to bring the temperature to 120° C. The rest of the mixture was then fed into the reaction vessel for a total period of 1.83 hours. A one-gram aliquot of the reaction mixture was removed at this point and analyzed by the precipitation method described in Example 1. The solids content was 59.3%, representing a copolymer conversion of 59.5%. Between 1.83 and 2.0 hours 12.6 parts of dimethylaminoethyl methacrylate was added. The mixture was stirred and heated at 117°–120° C. for 4 hours, thereafter at 102°–115° C. for a total heating period of 9 hours. Additional quantities of the 54.9% of diisopropylbenzene hydroperoxide solution, each portion mixed with 21 parts of white mineral oil, and of 25% diisobutylphenoxyethoxyethyl benzyl dimethyl ammonium chloride, in butanol were charged during the course of the copolymerization as follows: at 2.67 hours, 0.23 and 0.04 part respectively; at 4, 4.67, 5.33, and 6 hours each, 0.34 and 0.06 part respectively. At 9 hours the batch was heated rapidly to 150° C./2 mm. to give 1721 parts of an oil solution of 44% graft copolymer. Its viscosity was 4310 centistokes at 210° F. A concentration of 0.125% graft copolymer effectively dispersed 0.4% asphaltenes in a test blend.

(b) The same materials in the same proportions were subjected to polymerization process in the conventional manner of preparing a mixture of the dimethylaminoethyl methacrylate and the methacrylic esters in the beginning and polymerizing 266.3 parts of this mixture. After the initial exothermic reaction, the rest of the mixture was charged. During the course of polymerization, the same quantities of catalyst, promoter, and oil were used as given in part (a). The stripped oil solution of the copolymer amounted to 1707.4 parts. Its viscosity was 3960 centistokes at 210° F. When this copolymer was tested for asphaltenes dispersancy in comparison to the copolymer described in part (a), twice as much copolymer was required to disperse the same quantity of asphaltenes.

*Example 22*

There were mixed 45 parts of lauryl methacrylate and 0.12 part of 51.5% solution of diisopropylbenzene hydroperoxide. A portion of 10.2 parts of this mixture and 0.45 part of a butanol solution of 1.7% diisobutylphenoxyethoxyethyl benzyl dimethyl ammonium chloride was charged to a reaction vessel which was swept with nitrogen and heated at 111° C. Twenty minutes was allowed for the first exothermic reaction to subside. Then the rest of the mixture was added. A small sample was removed after 1.83 hours and analyzed by the method given in Example 1. A 61% homopolymer conversion was shown. During the interval between 1.83 and 2 hours 5 parts of N-vinyl-N'-dimethylaminoethyl ethylene urea was charged. Until the end of the fourth hour, the temperature was held at 111°–115° C. It was then held at 94°–101° C. for the rest of the heating period (6.75 hours). Additions of diisopropylbenzene hydroperoxide in 51.5% solution were made at 2.67 hours in an amount of 0.024 part and at 4, 4.67, 5.3, and 6 hours each in amounts of 0.036 part. Additions of butanol solution containing 1.7% diisobutylphenoxyethoxyethyl benzyl dimethyl ammonium chloride were also made at 2.67 hours in an amount of 0.1 part and at 4, 4.67, 5.3, and 6 hours in amounts of 0.14 part at each time. Portions of toluene added during the course of the copolymerization amounted to 18.7 parts. At 6.5 hours 31.3 parts of toluene was added. The product was a 42.5% solution of graft copolymer, corresponding to a yield of 81.5%. The viscosity of a 30% solution in toluene was 638.6 centistokes at 100° F.

A portion (87.4 parts) of the 42.5% solution was mixed with 6.2 parts of white mineral oil and 80.5 parts of light lubricating oil and stirred and heated under reduced pressure to 146° C./1.3 mm. to give 130 parts of stripped oil solution containing 28.6% of graft copolymer. Its viscosity at 210° F. was 1030 centistokes.

When 1% of this graft copolymer was mixed with asphaltenes in an oil test blend, excellent dispersancy resulted. Further, a portion of this copolymer was tested for oxidation performance. Fifty parts of a test blend were prepared by incorporating 1.0% of copolymer, 1.5% of an oxidation inhibitor which was a barium salt of the reaction product of pinene and phosphorus pentasulfide, and 0.4% of mercaptobenzothiazole in a base oil and heating at 175° C. Oxidation was carried out by bubbling air through the sample at the rate of 10 liters per hour for 20 hours. Metallic copper and lead were added to catalyze the reaction as experience has shown that the presence of these metals aggravates sludge formation.

Upon completion of this test, the contents of oxidation tube were allowed to cool and the appearance of both the oxidation tube and the sample was noted. The presence of sludge on the sides or bottom of the oxidation tube constitutes a failure. The oxidized blend containing the above copolymer passed this test satisfactorily.

A mixture of monomers used above was polymerized by the conventional copolymerization process. Twice as much copolymer was required to secure the same degree of dispersancy of asphaltenes as was obtained with the above copolymer. Also, at least twice as much of this conventional copolymer was necessary to prevent the appearance of sludge in the oxidation test.

*Example 23*

A mixture was prepared from 8.2 parts of lauryl methacrylate, 0.5 part of toluene, and 0.125 part of 10% solution of diisopropylbenzene hydroperoxide. The 10% solution of hydroperoxide was prepared by adding the required amount of n-butanol to the commercial 50% solution. A portion of 2.2 parts of this mixture and 0.025 part of butanol solution of 5% diisobutylphenoxyethoxyethyl benzyl dimethyl ammonium chloride were charged to a reaction vessel swept with nitrogen and heated at 123° C. Twenty minutes were allowed for the exothermic reaction to subside. Thereupon the rest of the mixture was charged during the next 100 minutes. The conversion of homopolymer at this stage was 50%. During the interval between 2 hours and 2.25 hours, a mixture of 2 parts of N-vinyl-N-methylacetamide, B.P. 73°–76° C./35 mm., and 0.1 part of the 10% solution of diisopropylbenzene hydroperoxide was added. Until the end of the fourth hour, the temperature of the heating bath was held at 123° C. to keep the batch at 111° C. It was then held at 113° C. for the rest of the copolymerization cycle for a total of 7 hours. A 10% solution of diisopropylbenzene hydroperoxide was added as follows: at 2.8 hours, 0.025 part; at 4 hours, 0.038 part; and at 4.67 hours, 5.33 hours, and 6 hours each, 0.025 part. Each time initiator was added, 0.5 part toluene and diisobutylphenoxyethyl benzyl dimethyl ammonium chloride, amounting to one-tenth the quantity of hydroperoxide, was also added. At 6.75 hours, 10 parts toluene was charged. The product was 24 parts of toluene solution which contained by analysis 32.6% of nonvolatile matter. A toluene solution of 30% of graft copolymer gave a viscosity of 166.6 centistokes at 100° F.

A portion of the 32.6% solution was mixed with light petroleum oil and the mixture was heated under reduced pressure to 140° C./2.5 mm. to give a concentrate. When this concentrate was used in making test blends, it was found that 0.125% of the graft copolymer was a most satisfactory dispersant for 0.4% of asphaltenes.

However, 2% of a copolymer made by the conventional polymerization process from the same materials did not disperse 0.4% of asphaltenes satisfactorily.

*Example 24*

A mixture was prepared from 47.5 parts of lauryl methacrylate, 2.5 parts of toluene, and 0.05 part of azodiisobutyronitrile. A portion of 12.7 parts of this mixture was run into a reaction vessel which was flushed with nitrogen and heated at 118° C. After a 20-minute heating period, the remainder of the above mixture was added slowly over 1.67 hours. At the end of 2 hours, all the mixture had been introduced into the reaction vessel. At 2 hours an aliquot was removed and analyzed by the nonvolatile method (4 hours at 150° C.) to show the homopolymer yield to be 69.4%. A second mixture of 2.5 parts of 4-vinylpyridine, 1.0 part of toluene, and 0.013 part azodiisobutyronitrile was fed into the same reaction vessel during 5 minutes. Additions of azodiisobutyronitrile were made of 0.01, 0.015, 0.01, 0.01, and 0.01 part each in 2.5 parts of toluene at 2.75, 4.0, 4.67, 5.33, and 6.0 hours, respectively. At 4.0 hours the temperature was lowered to 105° C. and this temperature was maintained until a total of 7.08 hours when heating was discontinued. At 6.58 hours, there was added 50 parts of toluene and this mixture was stirred until heating was discontinued. The product was a 36.8% solution of graft copolymer in toluene. A 30% solution of the graft copolymer in toluene had a viscosity of 85.1 centistokes at 100° F.

A mixture of 90.4 parts of the 36.8% solution and 63.8 parts of a light lubricating oil was heated to 138° C./2–3 mm. to yield 111 parts of a 30% solution of graft copolymer in oil which had a viscosity of 266 centistokes at 210° F.

Five-tenths percent of this graft copolymer in a test blend dispersed 0.4% asphaltenes. This performance is far superior to that of a copolymer made by the conventional copolymerization process, as 2% of such a copolymer failed to disperse the same quantity of asphaltenes under the same test conditions.

*Example 25*

Chem. Abst. 52, 5882, refers to recent patents on N-vinyl-2-oxazolidinone, often called N-vinyl-2-oxazolidone.

The general procedure given in Example 16 was used in making a copolymer in toluene from the following total materials: 20 parts of lauryl methacrylate, 5.0 parts of N-(2-methacryloxyethyl)-2-oxazolidinone, 46.5 parts of toluene, 0.07 part of 100% diisopropylbenzene hydroperoxide, and 0.007 part of 100% diisobutylphenoxyethylbenzyldimethylammonium chloride. The delayed addition made at 2.0 hours consisted of the 5.0 parts of N-(2-methacryloxyethyl)-2-oxazolidinone mixed with 7.5 parts of lauryl methacrylate. The product was obtained as a toluene solution of graft copolymer which contained by analysis 17.6% of copolymer.

A portion of 68 parts of the 17.6% solution was mixed with the 33.7 parts of 150 SUS viscosity neutral oil and stirred and heated under reduced pressure, the temperature being carried finally for one hour to 135° C./10 mm. to give an oil solution containing 22.2% of copolymer. On subjecting this copolymer to the asphaltenes test, it was found that 2% of this graft copolymer effectively dispersed 0.2% of asphaltenes which is much superior to the dispersancy of a copolymer made by the conventional polymerization process.

Example 26

1-(2-methacryloxyethyl)-2,4,4-trimethylpyrrolidine was prepared from 1-(2-hydroxyethyl)-2,4,4-trimethylpyrrolidine by transesterification with methyl methacrylate in the presence of sodium methoxide. The new monomer boiled at 67° C./0.3 mm.–70° C./0.8 mm. and showed an $n_D^{20}$ of 1.4537.

The procedure for the delayed catalyzed addition of the nitrogen-containing monomer was employed as indicated in the preceding examples. To 283.8 parts of octyl methacrylate of 98.2% purity was added 0.375 part of a diisopropyl benzene hydroperoxide solution in alcohol and ketone as supplied commercially, 52.6% of active ingredient. A portion of 153 parts of this mixture was charged to a reaction vessel heated at 114° C. and swept with nitrogen, and when the batch temperature reached 105° C., 0.765 part of 4% solution of diisobutylphenoxyethoxyethyl benzyl dimethyl ammonium chloride was added. As soon as polymerization occurred, the rest of the catalyzed octyl methacrylate was added within a total period of 80 minutes. The charge was then heated 15 minutes, sampled and analyzed to show a 60% yield of octyl polymethacrylate.

A second mixture consisting of 21.5 parts of 1-(2-methacryloxyethyl)-2,4,4-trimethylpyrrolidine with 1.03 parts of the 52.6% solution of diisopropylbenzene hydroperoxide was then charged to the reaction vessel during 15 minutes. The batch temperature was kept at 108° C.–117° C. for 4 hours and at 95° C. for 2.75 hours. Increments of 52.6% solution of diisopropylbenzene hydroperoxide, of 4% solution of diisobutylphenoxyethoxyethyl benzyl dimethyl ammonium chloride, and of toluene, added during the course of the polymerization totaled 1.21 parts, 1.3 parts, and 30 parts, respectively. At 6.5 hours, 170 parts of toluene was charged and the batch allowed to cool. The product was obtained as a solution which analyzed 47.5% nonvolatile matter by heating analytical samples at 150° C. for 4 hours. The viscosity of a toluene solution of 30% graft copolymer was 410 centistokes at 100° F.

A portion of the 47.5% solution was mixed with 219 parts of mineral oil and heated with stirring under reduced pressure to 143° C./3.8 mm. to give an oil solution of 46.3% graft copolymer. At 210° F., its viscosity was 3109 centistokes.

The minimum quantity of copolymer to disperse 0.4% asphaltenes in a test blend was 0.125%. This is far superior in dispersancy effectiveness in comparison to the comparable copolymer made by the conventional polymerization process.

A solution of 30% of this graft copolymer in toluene is mixed with tributyl phosphate and the mixture is stirred and heated under reduced pressure, finally to a temperature of 120° C. at 2 mm. The resulting solution is adjusted to 25% of copolymer in tributyl phosphate. This solution has a viscosity of 150 centistokes at 210° F. This solution is useful in preparing hydraulic fluids based on phosphate esters.

Example 27

There are mixed 22.5 parts of lauryl-myristyl methacrylate with 1.3 parts of toluene and 0.063 part of diisopropylbenzene hydroperoxide from a 50% solution alcohol and ketone. This is heated under nitrogen to 115° C. and 0.063 part of a 5% solution of diisobutylphenoxyethoxyethylbenzyldimethylammonium chloride is added. After two hours the conversion to polymer is 66%. Thereupon there is added 2.5 parts of diethylaminoethyl vinyl thioether mixed with 0.063 part of a 10% of diisopropylbenzene hydroperoxide over a period of 15 minutes. Heating is continued at 111° C.–113° C. for two hours, and then at 104° C. for 4.5 hours. Increments of the 10% solution of diisopropylbenzene hydroperoxide are added during polymerization totaling 0.346 part, also 5% solution of the above quaternary salt to a total of 0.7 part. Toluene is added to a total of 15 parts of toluene. There is formed a 53% solution of graft copolymer. This copolymer is transferred to oil in the usual manner with stripping off of toluene.

When this solution of graft copolymer is tested against asphaltenes, it is found to be a good dispersant, 2% of copolymer giving a clear dispersion of asphaltenes in oil.

Example 28

There are mixed 30 parts of N,N-dimethylhydrazine and 40 parts of pyridine in a stirred reaction vessel. This mixture is stirred and heated at 50° C., whereupon 52.3 parts of methacryloyl chloride is slowly added. An exothermic reaction rapidly carries the temperature of the reaction mixture to 100° C. and the mixture is cooled to about 80° C. and held at 80° C. to 100° C. while the addition of methacryloyl chloride is completed. The reaction mixture is allowed to stand at room temperature for 16 hours. It is washed with water and extracted with ethylene dichloride. The organic layer is distilled. The fraction coming over at 75° C./4 mm. to 108° C./10 mm. is N'-methacrylyl-N,N-dimethylhydrazide.

There are mixed 8 parts of dodecyl methacrylate and 5 parts of toluene. This mixture is heated to 115° C. and treated with 0.025 part of diisopropylbenzene hydroperoxide in solution and 0.005 part of a 25% solution of diisobutylphenoxyethoxyethylbenzyldimethylammonium chloride. At the end of two hours there is a conversion to 65% of polymer. Thereupon there is added 2 parts of N'-methacrylyl-N,N-dimethylhydrazide. Polymerization is continued at 115° C. for four hours with additions from time to time of more diisopropylbenzene hydroperoxide, totaling 0.028 part together with 0.006 part of the quaternary ammonium solution. Addition is made of 15 parts of toluene. The polymerization is terminated after 6:5 hours. The product is a toluene solution of 41% of graft copolymer.

When this is tested in oil containing 0.4% of asphaltenes, it is found that this graft copolymer is a very good dispersant.

A somewhat similar, but conventional copolymer made by mixing the comonomers at the start gives a product deficient or lacking in dispersing properties.

Example 29

A mixture is prepared from 40 parts of stearyl methacrylate, 40 parts of dodecyl acrylate, 20 parts of toluene, and 0.15 part of dimethyl azodiisobutyrate. This mixture is slowly run into a reaction vessel which has been flushed with nitrogen and heated to 110°–112° C. After three hours, a test sample shows that conversion to polymer is 59%. There is added a portion of 30 parts of toluene and 0.03 part of dimethyl azodiisobutyrate followed by a mixture of 10 parts of hexyl acrylate, 8 parts of dimethylaminoethyl vinyl ether, and 2 parts of N-vinyl piperidinone. The temperature of the reaction mixtures is lowered to about 100° C. and addition is made of small increments of the initiator from time to time over a period of 16 hours with additions of toluene to a total of 250 parts. The yield of graft copolymer is 96%. When the solution of graft copolymer is adjusted to 30% of copolymer, it has a viscosity of 169 centistokes at 100° F.

A portion of this solution is mixed with a 100 neutral oil and heated to 120° C. under reduced pressure to remove volatiles. The resulting oil solution is adjusted to a graft copolymer content of 30%. A sample of this stock solution is added to oil to give a solution containing 2% of copolymer. This dilute solution is subjected to the asphaltenes test. It readily disperses 0.4% of asphaltenes. In the same way any of the numerous vinyl ethers which have been indicated above may be incorporated into copolymers which have the useful properties herein described.

Example 30

A mixture was prepared from 25 parts of pure lauryl-myristyl methacrylate, 1.5 parts of toluene, and 0.06 part of benzoyl peroxide. This mixture was fed during 2.1 hours into a reaction vessel heated at 110°–116° C. and swept with nitrogen. At 2.1 hours, when the extent of homopolymerization was about 68%, the addition of a second mixture was started. This mixture consisted of 4.5 parts of N-methyl maleimide, 18 parts of acetone, and 0.02 part of benzoyl peroxide. It was charged during 0.17 hour. Because of the refluxing acetone, the batch temperature was lowered to 75°–77° C. for the next two hours but increased gradually to 103° C. as the acetone was swept out of the reaction vessel with the nitrogen gas. The temperature of the batch was then held at 103° C. for the rest of the copolymerization cycle, a total of 7 hours. Increments of additional benzoyl peroxide and toluene added during the course of the copolymerization totaled 0.06 and 37.5 parts respectively. At 7 hours, the batch was allowed to cool to 30° C. and contained by analysis 43.6% of graft copolymer by the nonvolatile method of heating the analytical samples for 4 hours at 150° C. in a forced draft electric oven. An 87.7% yield of graft copolymer was thus obtained.

A portion of the toluene solution was mixed with light lubricating oil and stirred and heated to 135° C./10 mm. to give a concentrate containing 30% of graft copolymer. When this graft copolymer was tested for dispersancy of asphaltenes, it was found that 2% of copolymer dispersed 0.2% of asphaltenes readily. This performance is far superior to that of a copolymer made by the conventional copolymerization process. N-alkyl maleimides do not, however, give copolymers exhibiting dispersancy as good as certain other nitrogen-containing monomers.

Important aspects of this invention and also some of its values rest upon the possibilities of a wide choice of starting materials and of a range of proportions of these materials so that graft copolymers which are effective dispersants and detergents in oil systems can be prepared from the most available starting monomers or the monomer or combination of monomers which will lead to graft copolymers exhibiting desired combinations of properties. This permits adjustments to meet a variety of situations, problems, and solutions.

For instance, it may be desired to provide a graft copolymer not only having good dispersing action, especially at low temperatures, but also supplying improved properties as to viscosity, including viscosity-temperature relationships, thus providing a higher viscosity index for an oil containing a copolymer. This can be accomplished by providing one or more kinds of polymer units from monomer or monomers providing good solubility in oils, such as octadecyl and/or hexadecyl (or larger alkyl)acrylate, methacrylate, itaconate, maleate, fumarate, or similar polymerizable monoethylenically unsaturated monomers and mixtures thereof, or vinyl carboxylates, with a large hydrocarbon group, units from one or more kinds of monomer or monomers which do not give polymers freely soluble in oil, such as lower alkyl acrylates, methacrylates, itaconates, maleates, fumarates, or similar polymerizable esters, such as vinyl carboxylates, or comonomers which are copolymerizable with the above solubilizing comonomers or mixtures thereof, and units from one or more nitrogen-containing comonomers defined herein or mixtures thereof. The lower alkyl groups mentioned above can desirably vary from methyl to octyl, but are preferably not larger than butyl.

The proportions of these three types of units may vary with the choice of comonomers and the oil in which the final copolymer is to be dissolved. In general, there may be copolymerized by the process of this invention for the above-noted purposes, between 30 and 70 parts by weight of one or more monomers supplying oil-solubility, 30–70 parts of lower alkyl-containing monomer or monomers, and 1–30 parts of one or more nitrogen-containing monomers, the total parts being 100. The proportion of the last kind of monomer which should be used will depend in part, as explained earlier, upon the type of nitrogen-containing monomer selected.

In addition to these three specific types, there may be copolymerized small amounts of other kinds of polymerizable monovinylidene monomer, such as acrylonitrile, vinyl ethers, vinyl thioethers, styrene itself, and ring-substituted styrenes, or other such miscellaneous monovinylidene compound such as shown above, these in general replacing the second of the above kinds of monomers.

In a special case or subclass which may be considered along with the above or as part thereof, there may be mentioned copolymers with the catalyzed delayed addition of the nitrogenous monovinylidene compound starting with the dialkyl fumarates or maleates, and vinyl acetate. Here preferred proportions of the ester or esters supplying good oil-solubility, ROOCCH=CHCOOR, where R is an alkyl group of 16 to 24 (preferably 16 to 18) carbon atoms, may be 20 to 70 parts by weight. The lower alkyl ester, which may be any of the monoethylenically unsaturated alkyl esters described above with alkyl groups up to 8 or 12 carbon atoms, and here particularly dialkyl esters $R^0$OOCCH=CHCOOR$^0$, where $R^0$ is alkyl from one to 14 carbon atoms, may constitute 2 to 50 parts by weight. With the maleates and fumarates it is very helpful in reaching medium to large molecular weights of the final copolymers to use 5 to 25 parts of vinyl acetate along with the previous two kinds of monomers. The nitrogen-containing vinylidene compound will then be used in the proportion of 1 to 30 parts, preferably 2 to 20 parts. The parts will, of course be taken to make 100 and the relative proportions of the four kinds of comonomers will be selected to ensure solubility in the particular fluid in which it is to be used.

The above comonomers can be combined to provide by the process of this invention graft copolymers exhibiting not only dispersing action, but also viscosity index improvement and/or pour depressing activity. They have an advantage in resisting depolymerization when heated, but they should be used under conditions where water or moisture is not a problem, since hydrolysis of the acetate group may occur with subsequent possibilities of corrosion from hydrolysis products.

A very useful graft copolymer can be prepared as in above Example 10 (a) by polymerizing a mixture containing about 60 parts of a cetyl-stearyl fumarate, 2 to 3 parts of dimyristyl fumarate, and about 25 parts of vinyl acetate until about 60% of this mixture of comonomers has polymerized, then adding about 25 parts of N-vinyl pyrrolidinone, and continuing polymerization. An oil containing 0.8 percent of the final graft copolymer readily disperses 0.4% of asphaltenes.

The process of this invention makes possible the preparation of oil-soluble, dispersing graft copolymers based on a considerable proportion of styrene, vinyltoluene, or similar ring-substituted styrene. These graft copolymers are particularly desirable for use in fuel oils, where there may be exposure to moisture under conditions which may lead to emulsifying or foaming. For preparation of graft copolymers having good low temperature dispersing activity coupled with low foaming and emulsifying tendencies, copolymers are prepared from 30 to 60 parts of a polymerizable alkyl ester with 16 to 24 carbon atoms in the alkyl portion thereof, or mixtures of such esters, alkyl acrylates, methacrylates, itaconates, maleates, and fumarates and vinyl carboxylates being typical, from 15 to 60 parts of a styrene or mixtures of such styrenes, and from 5 to 20 parts of a polymerizable, monovinylidene, nitrogen-containing monomer as herein defined or mixtures thereof, the total parts being 100. The preferred proportion of nitrogen-containing monomer is here 8 to 12 parts. Again, choice of monomers and proportions should be made with reference to the type of petroleum liquid or other type of oil in which the copolymer is to be used. Again, minor proportions of one or more of the above-noted miscellaneous comonomers may be used along with one or more of the several types of polymerizable esters.

Yet another subclass of graft copolymers comprises those which impart dispersing activity and at the same time pour point depressing action when placed in a waxy oil. Such graft copolymers may or may not at the same time act as viscosity index improvers. This subclass is prepared from 30 to 80 parts of at least one polymerizable ethylenically unsaturated ester with alkyl groups of 16 to 18 or more carbon atoms, from 30 to 50 parts of at least one polymerizable ester with alkyl groups of not over 14 carbon atoms, and from one to 30 parts of a polymerizable, monovinylidene nitrogen-containing monomer as herein defined, the total parts being 100. The several kinds of polymerizable esters are of the structures shown in the previous subclasses. Again, one or more of the miscellaneous comonomers may be used in minor amounts. A virtue of these pour depressing graft copolymers lies in the stability of the reduced pour point which they promote.

The nitrogen-containing compounds which are used in the process of this invention may be accurately defined as polymerizable monovinylidene compounds which contain a trivalent nitrogen which carries at least two different substituents and which is bound to a carbon atom of a substituent. This characterizing nitrogen atom is thus of the type of an amino nitrogen or an amido nitrogen and as such it may carry as the polymerizing group a vinyl, vinyloxyalkyl, vinylthioalkyl, vinylpolyoxyalkyl, acrylyl, methacrylyl, acryloxyalkyl, acrylpolyoxyalkyl, methacryloxyalkyl, methacrylpolyoxyalkyl, or an aromatically unsaturated group carrying a vinyl group, and it may carry hydrogen or an alkyl, cycloalkyl, aryl, aralkyl, alkylcarbonyl, cycloalkylcarbonyl, or arylcarbonyl group, or it may be part of a heterocycle, in which case it is bound to a polyvalent carbon-containing chain with four to six atoms in the chain itself, forming a heterocycle with the nitrogen, which atoms may carry substituents or groups, as illustrated by the numerous heterocyclic compounds shown above which are polymerizable. The above-noted aromatically unsaturated group carrying a vinyl group, it will be recognized, includes the several aminostyrenes, dimethylaminomethylstyrenes, other dialkylaminomethylstyrenes, such as N,N-diethylaminomethylstyrene, and also the vinylpyridines.

Graft copolymers prepared according to the process of this invention can vary greatly in apparent molecular weight. In cases where bodying of an oil is desired and resistance to shear is not important, graph copolymers may be prepared with molecular weights of over a million, whether number average or weight average molecular weights. Known ways of securing high molecular weights of polymers are applicable here, such as forming polymer and copolymer in concentrated solution, adding a low proportion of free radical initiator, and polymerizing in a relatively low temperature range.

On the other hand, if polymerization is effected in less concentrated solution with a relatively high concentration of initiator and/or at high temperatures, as is known in the art, then molecular weights of copolymers fall in the low range, being held, for example, if desired, to a range of 1,000 to 20,000 or somewhat more. Conditions may also be adjusted to produce copolymers of molecular weights of intermediate range.

For example, a graft copolymer prepared by mixing together octadecyl methacrylate (27 parts), dodecyl methacrylate (15 parts), hexyl methacrylate (13 parts), and butyl methacrylate (23 parts), and polymerizing at 80° C. with 0.04 part of benzoyl peroxide until about 80% of the mixture is polymerized. About five parts of toluene is added. Then, a mixture of 10 parts of N-vinyl pyrrolidinone in 12 parts of dodecyl methacrylate is copolymerized with the first formed polymer with addition of 0.02 part of diisopropylbenzene hydroperoxide and 0.002 part of a quaternary ammonium salt (dodecenyltrimethylammonium chloride) at 100° C. to 105° C. with small additions of toluene to a total of 380 parts over a period of 24 hours. The resulting graft copolymer has a number average molecular weight as determined by osmometry of about 325,000 to 350,000. On the other hand, the weight average molecular weight as determined by intrinsic viscosity is close to two million. A similar value is obtained by light scattering.

On the other hand, graft copolymers formed as in Example 1 have molecular weights by the intrinsic viscosity method of 90,000 to 100,000. Again, the graft copolymers shown below in tests PL2096-1 and PL2096 have number average molecular weights of 150,000 to 175,000 and weight average molecular weights of 900,000 to 1,000,000.

Graft copolymers prepared according to the method of this invention are highly useful as additives to petroleum liquids and other lubricants, including synthetic lubricants. When dissolved in fuel oils, kerosenes, jet fuels, furnace oils, and similar light combustible liquids, they serve as dispersants for gums or sludges which may form. A concentration from about 0.001% to 0.2% by weight is sufficient in such liquids to provide desirable and effective protection against deposition or separation of gums, resins, or sludges.

Similarly, the graft copolymers of this invention can be dissolved in lubricating oils at concentrations, however, from about 0.03 to 10%, preferably 0.1 to 5%, to disperse gums, resins, or sludges which may form and thus prevent their deposition on engine parts.

Superiority of graft copolymers prepared according to the process of this invention is supported by engine tests in accordance with the FL-2 procedure of the Coordinating Research Council. In these tests, a six cylinder Chevrolet engine is operated for 40 hours for any single evaluation under fixed conditions of speed, oil temperature, and engine load. The engine is then taken down and parts are examined and rated for cleanliness on a 0 to 10 scale for each part, 10 being clean. A perfect score would be 20 for varnish ratings and 80 for sludge ratings.

The same engine is used for a series of tests which are to be compared. The same fuel is used in all tests that are to be compared.

In test PL1813, the base oil was used without detergent. This oil contained 0.83 weight percent of zinc dialkyldithiophosphate. In test PL2096-1, there was used the same base oil with the above zinc salt plus 0.70 percent by weight of a copolymer prepared in the conventional way by mixing 30 parts of stearyl methacrylate, 10 parts of tetradecyl methacrylate, 40 parts of dodecyl methacrylate, 12 parts of butyl methacrylate, and 8 parts of N-vinylpyrrolidinone and initiating polymerization of this mixture with a peroxidic catalyst. This copolymer has thus far proved to be a very effective dispersing agent in lubricating oils and is about as effective as any copolymer made by the conventional process. In test PL2131 there was used the same base oil, with the zinc salt above noted plus 0.70 percent of a copolymer made from the same starting monomers in the same proportions as just given, but with initial polymerization of a mixture of polymerizable esters, until about 60% of these monomers had formed polymer. At this time there was slowly added the N-vinylpyrrolidinone dissolved in a minor proportion of the dodecyl methacrylate.

The findings are summarized in Table A. As will be seen from an inspection of the ratings, the copolymer of this invention is definitely superior to even the copolymer which was previously regarded as very good in dispersing action.

TABLE A.—DATA FOR FL-2 ENGINE TESTS

| Engine Parts | Cleanliness Ratings | | |
| --- | --- | --- | --- |
| | PL1813 | PL2096-1 | PL2131 |
| Varnish Deposits on: | | | |
| Piston Skirts | 4.1 | 7.0 | 6.5 |
| Cylinder Walls | 3.7 | 4.9 | 5.6 |
| Total Varnish | 7.8 | 11.9 | 12.1 |
| Sludge Deposits on: | | | |
| Valve Deck | 8.5 | 9.5 | 9.3 |
| Rocker Arm Assembly | 7.5 | 9.5 | 9.5 |
| Rocker Arm Cover Plate | 7.5 | 9.5 | 9.5 |
| Oil Screen | 9.0 | 10.0 | 10.0 |
| Push Rod Cover Plate | 5.0 | 7.5 | 9.5 |
| Crankcase Oil Pan | 8.5 | 9.0 | 9.0 |
| Push-rod Chamber | 4.5 | 6.0 | 9.0 |
| Oil Ring Slots | 6.7 | 8.6 | 9.3 |
| Total Sludge | 57.2 | 69.6 | 75.1 |
| Total Varnish and Sludge | 65.0 | 81.5 | 87.2 |

The above data demonstrate a marked effectiveness for the graft copolymer prepared according to the process of this invention and a significant improvement over a conventional copolymer which has been regarded as good.

In the set of tests summarized in Table A there was used a relatively "clean" fuel, that is, a gasoline which was regarded as not causing bad deposits on engine parts. There was also made a set of tests with a fuel which tended to cause more than average deposits, a so-called "dirty" fuel. In these tests the same base oil with the same zinc dialkyldithiophosphate at 0.83 weight percent was used. In test PL2098 no dispersant or detergent was used, this test being used as a control. In test PL2096 there was added to the oil 0.7 weight percent of a conventional polymer made by mixing 30 parts of stearyl methacrylate, 10 parts of tetradecyl methacrylate, 40 parts of dodecyl methacrylate, 12 parts of butyl methacrylate, and 8 parts of N-vinylpyrrolidinone and initiating free radically the polymerization of the mixture. In test PL2071 there was used the same base oil and inhibitor to which was added 0.7 weight percent of a graft copolymer made from the same starting materials in the same proportions as just above but with initial polymerization of a mixture of the esters to about 60% followed by addition of the N-vinylpyrrolidinone dissolved in a little dodecyl methacrylate with subsequent catalyzed polymerization.

Results of this test are presented in Table B.

TABLE B.—DATA FOR FL-2 ENGINE TESTS

| Engine Parts | Cleanliness Ratings | | |
| --- | --- | --- | --- |
| | PL2098 | PL2096 | PL2071 |
| Varnish Deposits on: | | | |
| Piston Skirts | 3.0 | 4.1 | 8.0 |
| Cylinder Walls | 2.4 | 3.1 | 6.8 |
| Total Varnish | 5.4 | 7.2 | 14.8 |
| Sludge Deposits on: | | | |
| Valve Deck | 6.0 | 8.0 | 9.5 |
| Rocker Arm Assembly | 7.5 | 7.5 | 9.8 |
| Rocker Arm Cover Plate | 7.0 | 7.0 | 9.0 |
| Push-rod Cover Plate | 6.0 | 7.0 | 6.0 |
| Oil Screen | 4.0 | 10.0 | 10.0 |
| Crankcase Oil Pan | 6.5 | 8.0 | 9.5 |
| Push-rod Chamber | 6.0 | 6.0 | 8.0 |
| Oil Ring Slots | 5.5 | 5.8 | 9.6 |
| Total Sludge | 48.5 | 59.3 | 71.4 |
| Total Varnish and Sludge | 53.9 | 66.5 | 86.2 |

The superiority of the graft copolymer formed by catalyzed delayed addition of the nitrogen-containing comonomer is clear.

The graft copolymers of this invention are useful not only as additives in lubricating oils for spark-ignition engines, as demonstrated by the typical engine tests reported above, but also in oils for compression-ignition engines. Typical graft copolymers prepared by the process of this invention have been examined in oils used for the latter purpose and found to be effective dispersant-detergents.

A standard method for evaluating oils in diesel engines is designated by the L-1 engine test and is performed with a small Caterpillar diesel engine. The engine is run under fixed conditions and the parts are then examined for deposits. Of particular importance is the extent of filling of the top ring groove.

A graft copolymer prepared as in Example 1, was dissolved at a concentration of 2% in a standard lubricating oil for this diesel engine. This oil contained 1% of a commercial inhibitor for this type of service, a zinc dialkyldithiophosphate. The fuel used was a typical diesel fuel oil with a sulfur content of 0.35%. The engine was run for 480 hours and then examined. There was only 20% top ring groove filling. The engine parts were relatively clean. This is considered a very acceptable result.

I claim:

1. A process for preparing oil-soluble, dispersing graft copolymers which comprises polymerizing in the presence of a free radical polymerization initiator from the class consisting of peroxidic and azo polymerization catalysts polymerizable monoethylenically unsaturated monomer until 40% to 85% thereof has polymerized whereby a polymerizing mixture of monomer and soluble polymer is formed, said monomer being selected from at least one member of the class consisting of alkyl esters of acrylic, methacrylic, itaconic, fumaric, and maleic acids, vinyl esters of alkanoic acids, mixtures of said alkyl esters and styrene, and mixtures of said alkyl esters with a minor proportion from the class consisting of acrylonitrile, methacrylonitrile, and vinyl alkyl ethers, the alkyl portion of said alkyl esters and of said alkanoic acid being of sufficient size to impart solubility of copolymer in hydrocarbon oils and having an average size of at least eight carbon atoms, then adding to said polymerizing mixture at least one polymerizable nitrogenous monovinylidene compound from the class consisting of (a) N-vinyl lactams having the formula

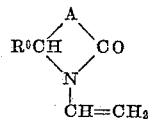

wherein $R^0$ is a member of the class consisting of hydrogen and alkyl groups of one to four carbon atoms and A is an alkylene group of two to ten carbon atoms with two to four carbon atoms between the two carbon atoms of the ring in said formula, (b) N-vinyl oxazolidone (c) N-vinyl imides having the structure

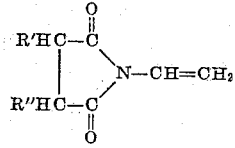

wherein $R'$ and $R''$ when taken individually represent a member of the class consisting of hydrogen and alkyl groups of one to five carbon atoms and when taken together represent a hydrocarbon chain forming a carbocycle with the carbon atoms carrying $R'$ and $R''$, (d) N-vinyl ethyleneurea, N-vinyl-N,N'-diphenylurea and N - vinyl-N'-(β-dimethylaminoethyl)ethyleneurea, (e) N-vinyl carboxylic amides of the formula

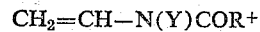

wherein Y represents a member of the class consisting of hydrogen, alkyl, and the phenyl group and R+ represents a member of the class consisting of alkyl, cycloalkyl and phenyl groups,
(f) acrylic esters of the structure

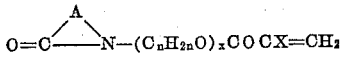

wherein A is an alkylene group of 3 to 12 carbon atoms with 3 to 5 carbon atoms between the O=C group and N, x has a value of one to four, n is an integer of one to four when x has a value of one and of two to four when x has a value greater than one, and X is a member of the class consisting of hydrogen and the methyl group,
(g) amidoalkyllactams of the structure

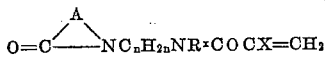

wherein A is an alkylene group of 3 to 12 carbon atoms with 3 to 5 carbon atoms between the O=C group and N, n is an integer from 2 to 3, X is a member of the class consisting of hydrogen and the methyl group, and $R^x$ represents a member of the class consisting of hydrogen and phenyl and alkyl groups,
(h) acrylamidoethyloxazolidone,
(i) methacrylamidoethyloxazolidone,
(j) amides of the structure

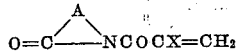

where A is an alkylene group of 3 to 12 carbon atoms with 3 to 5 carbon atoms between the O=C group and N and X is from the class consisting of hydrogen and the methyl group,
(k) amides of the structure $$R^1R^2NCOCX=CH_2$$

wherein $R^1$ and $R^2$ when taken individually represent hydrogen and alkyl groups of one to four carbon atoms, and cycloalkyl and benzyl groups, and when taken together represent a member of the class consisting of —CH$_2$CH$_2$OCH$_2$CH$_2$—, —CH$_2$CH$_2$CH$_2$CH$_2$—, and
—CH$_2$CH$_2$CH$_2$CH$_2$CH$_2$— groups, and X is from the class consisting of hydrogen and the methyl group,
(l) N-vinyl amines of the formula

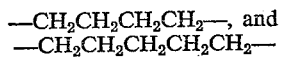

wherein $R^1$ is a member of the class consisting of hydrogen and cycloalkyl, phenyl, and alkyl groups of 1 to 12 carbon atoms, $R^2$ is a member of the class consisting of cycloalkyl, phenyl, and alkyl groups of 1 to 12 carbon atoms, and $R^1$ and $R^2$ when taken together form a divalent aliphatic chain of four to five carbon atoms from the class consisting of —CH$_2$CH$_2$CH$_2$CH$_2$—, —CH$_2$CH$_2$CH$_2$CH$_2$CH$_2$—, and —CH$_2$CH$_2$OCH$_2$CH$_2$—,
(m) vinylpyridines and vinylpyridines having an alkyl substituent of 1 to two carbon atoms,
(n) aminostyrenes,
(o) aminoalkyl vinyl ethers and thioethers in which the aminoalkyl group contains two to 5 carbon atoms, and
(p) aminoalkyl acrylates and methacrylates in which the alkyl group contains four to twenty-six carbon atoms, and continuing polymerization of the resulting mixture in the presence of a free radical polymerization initiator, the said polymerizable nitrogenous monovinylidene compound providing between 1% and 30% of the resulting copolymer.

2. A process for preparing oil-soluble, dispersing graft copolymers which comprises heating in the presence of a peroxidic free radical polymerization initiator a mixture of at least two alkyl methacrylates, the alkyl portion thereof having an average content of at least eight carbon atoms and being of sufficient size to supply solubility of the final copolymer in hydrocarbon oils, continuing heating until 40% to 85% of the said alkyl methacrylates has polymerized, whereby a polymerizing mixture containing monomer and soluble polymer is formed, then adding to said polymerizing mixture at least one polymerizable nitrogenous monovinylidene compound from the class consisting of (a) N-vinyl lactams having the formula

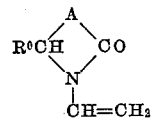

wherein $R^0$ is a member of the class consisting of hydrogen and alkyl groups of one to four carbon atoms and A is an alkylene group of two to ten carbon atoms with two to four carbon atoms between the two carbon atoms of the ring in said formula
(b) N-vinyl oxazolidone,
(c) N-vinyl imides having the structure

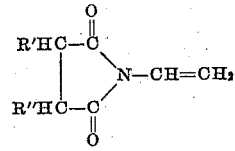

wherein R′ and R″ when taken individually represent a member of the class consisting of hydrogen and alkyl groups of one to five carbon atoms and when taken together represent a hydrocarbon chain forming a carbocycle with the carbon atoms carrying R′ and R″,
(d) N-vinyl ethyleneurea, N-vinyl-N,N′-diphenylurea and N-vinyl-N′-(β-dimethylaminoethyl)ethyleneurea,
(e) N-vinyl carboxylic amides of the formula $$CH_2=CH-N(Y)COR^+$$

wherein Y represents a member of the class consisting of hydrogen, alkyl, and the phenyl group and $R^+$ represents a member of the class consisting of alkyl, cycloalkyl and phenyl groups,
(f) acrylic esters of the structure

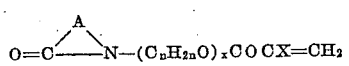

wherein A is an alkylene group of 3 to 12 carbon atoms with 3 to 5 carbon atoms between the O=C group and N, x has a value of one to four, n is an integer of one to four when x has a value of one and of two to four when x has a value greater than one, and X is a member of the class consisting of hydrogen and the methyl group,
(g) amidoalkyllactams of the structure

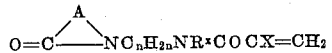

wherein A is an alkylene group of 3 to 12 carbon atoms with 3 to 5 carbon atoms between the O=C group and N, n is an integer from 2 to 3, X is a member of the class consisting of hydrogen and the methyl group, and $R^x$ represents a member of the class consisting of hydrogen and phenyl and alkyl groups,
(h) acrylamidoethyloxazolidone,
(i) methacrylamidoethyloxazolidone,
(j) amides of the structure

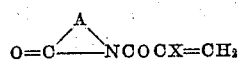

where A is an alkylene group of 3 to 12 carbon atoms with 3 to 5 carbon atoms between the O=C group and N and X is from the class consisting of hydrogen and the methyl group, (k) amides of the structure

wherein $R^1$ and $R^2$ when taken individually represent hydrogen and alkyl groups of one to four carbon atoms, and cycloalkyl and benzyl groups, and when taken together represent a member of the class consisting of $-CH_2CH_2OCH_2CH_2-$, $-CH_2CH_2CH_2CH_2-$, and
$-CH_2CH_2CH_2CH_2CH_2-$ groups, and X is from the class consisting of hydrogen and the methyl group, (l) N-vinyl amines of the formula

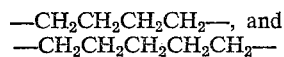

wherein $R^1$ is a member of the class consisting of hydrogen and cycloalkyl, phenyl, and alkyl groups of 1 to 12 carbon atoms, $R^2$ is a member of the class consisting of cycloalkyl, phenyl, and alkyl groups of 1 to 12 carbon atoms, and $R^1$ and $R^2$ when taken together form a divalent aliphatic chain of four to five carbon atoms from the class consisting of $-CH_2CH_2CH_2CH_2-$, $-CH_2CH_2CH_2CH_2CH_2-$, and $-CH_2CH_2OCH_2CH_2-$ (m) vinylpyridines and vinylpyridines having an alkyl substituent of 1 to two carbon atoms,
(n) aminostyrenes,
(o) aminoalkyl vinyl ethers and thioethers in which the aminoalkyl group contains two to 5 carbon atoms, and
(p) aminoalkyl acrylates and methacrylates in which the alkyl group contains four to twenty-six carbon atoms, and continuing polymerization of the resulting mixture in the presence of a free radical polymerization initiator, the said polymerizable nitrogenous monovinylidene compound providing between 1% and 30% of the resulting copolymer.

3. A process according to claim 2 in which there are used stearyl methacrylate, tetradecylmethacrylate lauryl methacrylate, and butyl methacrylate, the parts of these being about 30, 10, 40, and 12 respectively, the nitrogenous monovinylidene compound supplying 8 parts.

4. A process according to claim 2 in which a first alkyl methacrylate has alkyl groups of 16 to 18 carbon atoms and a second alkyl methacrylate has alkyl groups of 4 to 14 carbon atoms, these alkyl methacrylates being each present in proportions providing between 30 and 70 parts of the copolymer, the nitrogenous monovinylidene compound providing 1 to 30 parts, the total parts being 100.

5. A process according to claim 4 in which the first alkyl methacrylate is stearyl methacrylate and the second is butyl methacrylate.

6. A process according to claim 5 in which 55 parts of stearyl methacrylate and 37 parts of butyl methacrylate are used and the nitrogenous monovinylidene compound is N-vinyl-2-pyrrolidinone in the proportion of 8 parts.

7. A process for preparing oil-soluble dispersing graft copolymers which comprises polymerizing in the presence of a peroxidic free radical polymerization initiator (1) a first monoethylenically unsaturated ester of the formula ROOCCH=CHCOOR where R is an alkyl group of 16 to 24 carbon atoms, (2) a second monoethylenically unsaturated ester of the formula $R^0OOCCH=CHCOOR^0$ where $R^0$ is an alkyl group of one to 14 carbon atoms, the alkyl portion supplied by these two esters having an average carbon content of at least eight carbon atoms, and (3) vinyl acetate, continuing polymerization until 40% to 85% of these esters have formed polymer, then adding to said polymer a polymerizable nitrogenous monovinylidene compound, and continuing polymerization therewith, said first ester supplying 20 to 70 parts by weight, said second ester supplying 2 to 50 parts, the vinyl acetate supplying 5 to 25 parts, and the nitrogenous monovinylidene compound supplying 2 to 20 parts, said nitrogenous monovinylidene compound being selected from the class consisting of (a) N-vinyl lactams having the formula

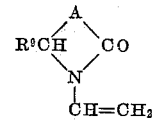

wherein $R^0$ is a member of the class consisting of hydrogen and alkyl groups of one to four carbon atoms and A is an alkylene group of two to ten carbon atoms with two to four carbon atoms between the two carbon atoms of the ring in said formula, (b) N-vinyl oxazolidone,
(c) N-vinyl imides having the structure

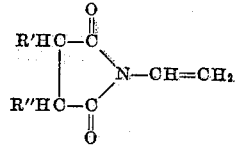

wherein R' and R'' when taken individually represent a member of the class consisting of hydrogen and alkyl groups of one to five carbon atoms and when taken together represent a hydrocarbon chain forming a carbocycle with the carbon atoms carrying R' and R'', (d) N-vinyl ethyleneurea, N-vinyl-N,N'-diphenylurea and N-vinyl-N'-(β-dimethylaminoethyl)ethyleneurea,
(e) N-vinyl carboxylic amides of the formula $CH_2=CH-N(Y)COR^+$ wherein Y represents a member of the class consisting of hydrogen, alkyl, and the phenyl group and $R^+$ represents a member of the class consisting of alkyl, cycloalkyl and phenyl groups, (f) acrylic esters of the structure

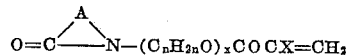

wherein A is an alkylene group of 3 to 12 carbon atoms with 3 to 5 carbon atoms between the O=C group and N, x has a value of one to four, n is an integer of one to four when x has a value of one and of two to four when x has a value greater than one, and X is a member of the class consisting of hydrogen and the methyl group, (g) amidoalkyllactams of the structure

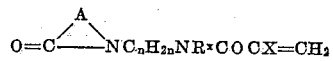

wherein A is an alkylene group of 3 to 12 carbon atoms with 3 to 5 carbon atoms between the O=C group and N, n is an integer from 2 to 3, X is a member of the class consisting of hydrogen and the methyl group, and $R^x$ represents a member of the class consisting of hydrogen and phenyl and alkyl groups (h) acrylamidoethyloxazolidone,
(i) methacrylamidoethyloxazolidone,
(j) amides of the structure

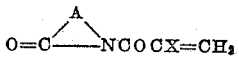

where A is an alkylene group of 3 to 12 carbon atoms with 3 to 5 carbon atoms between the O=C group and N and X is from the class consisting of hydrogen and the methyl group,
(k) amides of the structure $$R^1R^2NCOCX=CH_2$$

wherein $R^1$ and $R^2$ when taken individually represent hydrogen and alkyl groups of one to four carbon atoms, and cycloalkyl and benzyl groups, and when taken together represent a member of the class consisting of $—CH_2CH_2OCH_2CH_2—$, $—CH_2CH_2CH_2CH_2—$, and
$—CH_2CH_2CH_2CH_2CH_2—$ groups, and X is from the class consisting of hydrogen and the methyl group,
(l) N-vinyl amines of the formula

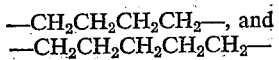

wherein $R^1$ is a member of the class consisting of hydrogen and cycloalkyl, phenyl, and alkyl groups of 1 to 12 carbon atoms, $R^2$ is a member of the class consisting of cycloalkyl, phenyl, and alkyl groups of 1 to 12 carbon atoms, and $R^1$ and $R^2$ when taken together form a divalent aliphatic chain of four to five carbon atoms from the class consisting of $—CH_2CH_2CH_2CH_2—$, $—CH_2CH_2CH_2CH_2CH_2—$,
and $—CH_2CH_2OCH_2CH_2—$ (m) vinylpyridines and vinylpyridines having an alkyl substituent of 1 to two carbon atoms,
(n) aminostyrenes,
(o) aminoalkyl vinyl ethers and thioethers in which the aminoalkyl group contains two to 5 carbon atoms, and
(p) aminoalkyl acrylates and methacrylates in which the alkyl group contains four to twenty-six carbon atoms, and continuing polymerization of the resulting mixture in the presence of a free radical polymerization initiator, the said polymerizable nitrogenous monovinylidene compound providing between 1% and 30% of the resulting copolymer.

8. A process according to claim 7 in which the first ester is dialkyl fumarate with 16 to 18 carbon atoms in the alkyl portion thereof, the second ester is dilauryl fumarate, and the nitrogenous monovinylidene compound is N-vinyl-2-pyrrolidinone in proportions of about 60, 2, and 25 respectively with vinyl acetate supplying about 13 parts.

9. A process for preparing oil-soluble, dispersing graft copolymers which comprises polymerizing together in the presence of a peroxidic free radical polymerization initiator an alkyl methacrylate having 16 to 24 carbon atoms in the alkyl portion thereof and styrene, the alkyl methacrylate supplying 39 to 60 parts by weight and being sufficient to provide oil-solubility of the final copolymer and the styrene supply 15 to 60 parts, continuing polymerization until 40% to 85% of said methacrylate and styrene have polymerized, then adding thereto a nitrogenous monovinylidene compound, and continuing polymerization therewith in the presence of a peroxidic free radical polymerization initiator, said compound supplying 5 to 20 parts by weight and being a member of the class consisting of
(a) N-vinyl lactams having the formula

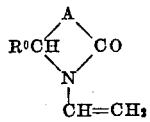

wherein $R^0$ is a member of the class consisting of hydrogen and alkyl groups of one to four carbon atoms and A is an alkylene group of two to ten carbon atoms with two to four carbon atoms between the two carbon atoms of the ring in said formula,
(b) N-vinyl oxazolidone,
(c) N-vinyl imides having the structure

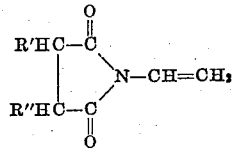

wherein R' and R'' when taken individually represent a member of the class consisting of hydrogen and alkyl groups of one to five carbon atoms and when taken together represent a hydrocarbon chain forming a carbocycle with the carbon atoms carrying R' and R'',
(d) N-vinyl ethyleneurea, N-vinyl-N,N'-diphenylurea and N-vinyl-N'-(β-dimethylaminoethyl)ethyleneurea,
(e) N-vinyl carboxylic amides of the formula $$CH_2=CH—N(Y)COR^+$$

wherein Y represents a member of the class consisting of hydrogen, alkyl, and the phenyl group and $R^+$ represents a member of the class consisting of alkyl, cycloalkyl and phenyl groups,
(f) acrylic esters of the structure

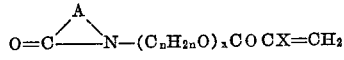

wherein A is an alkylene group of 3 to 12 carbon atoms with 3 to 5 carbon atoms between the O=C group and N, x has a value of one to four, n is an integer of one to four when x has a value of one and of two to four when x has a value greater than one, and X is a member of the class consisting of hydrogen and the methyl group,
(g) amidoalkyllactams of the structure

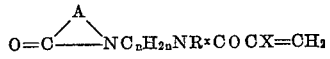

wherein A is an alkylene group of 3 to 12 carbon atoms wtih 3 to 5 carbon atoms between the O=C group and N, n is an integer from 2 to 3, X is a member of the class consisting of hydrogen and the methyl group, and $R^x$ represents a member of the class consisting of hydrogen and phenyl and alkyl groups,
(h) acrylamidoethyloxazolidone,
(i) methacrylamidoethyloxazolidone,
(j) amides of the structure

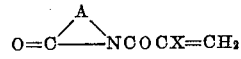

where A is an alkylene group of 3 to 12 carbon atoms with 3 to 5 carbon atoms between the O=C group and N and X is from the class consisting of hydrogen and the methyl group,
(k) amides of the structure $$R^1R^2NCOCX=CH_2$$

wherein $R^1$ and $R^2$ when taken individually represent hydrogen and alkyl groups of one to four carbon atoms, and cycloalkyl and benzyl groups, and when taken together represent a member of the class consisting of $—CH_2CH_2OCH_2CH_2—$ $—CH_2CH_2CH_2CH_2—$, and
$—CH_2CH_2CH_2CH_2CH_2—$ groups, and X is from the class consisting of hydrogen and the methyl group,
(l) N-vinyl amines of the formula

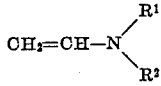

wherein $R^1$ is a member of the class consisting of hydrogen and cycloalkyl, phenyl, and alkyl groups of 1 to 12 carbon atoms, $R^2$ is a member of the class consisting of cycloalkyl, phenyl, and alkyl groups of 1 to 12 carbon atoms, and $R^1$ and $R^2$ when taken together form a divalent aliphatic chain of four to five carbon atoms from the class consisting of

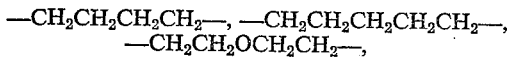

(m) vinylpyridines and vinylpyridines having an alkyl substituent of 1 to two carbon atoms,
(n) aminostyrenes,
(o) aminoalkyl vinyl ethers and thioethers in which the aminoalkyl group contains two to 5 carbon atoms, and
(p) aminoalkyl acrylates and methacrylates in which the alkyl group contains four to twenty-six carbon atoms, and continuing polymerization of the resulting mixture in the presence of a free radical polymerization initiator, the said polymerizable nitrogenous monovinylidene compound providing between 1% and 30% of the resulting copolymer.

10. The product of the process of claim 9.
11. A process according to claim 9 in which the nitrogenous monovinylidene compound is N-vinyl-2-pyrrolidinone.

References Cited in the file of this patent
UNITED STATES PATENTS

| | | |
|---|---|---|
| 2,072,465 | Reppe et al. | Mar. 2, 1937 |
| 2,180,083 | Mueller-Cunradi et al. | Nov. 14, 1939 |
| 2,538,779 | Harrison et al. | Jan. 23, 1951 |
| 2,838,456 | Banes et al. | June 10, 1958 |
| 2,839,512 | Barnum et al. | June 17, 1958 |
| 2,889,282 | Lorensen et al. | June 2, 1959 |

FOREIGN PATENTS

| | | |
|---|---|---|
| 764,300 | Great Britain | Dec. 28, 1956 |

OTHER REFERENCES

Graham et al.: German application, 1,024,240, printed Feb. 13, 1958 (K1 39c 2501).